US012545565B2

(12) United States Patent
Wu et al.

(10) Patent No.: US 12,545,565 B2
(45) Date of Patent: Feb. 10, 2026

(54) APPARATUS FOR IDENTIFICATION AND POSITIONING AND CARGO TRANSPORTATION APPARATUS

(71) Applicant: EFFITO PTE. LTD., Singapore (SG)

(72) Inventors: Longfei Wu, Guangdong (CN); Mu Fang, Guangdong (CN); Jianhui Yang, Guangdong (CN)

(73) Assignee: EFFITO PTE. LTD., Singapore (SG)

( * ) Notice: Subject to any disclaimer, the term of this patent is extended or adjusted under 35 U.S.C. 154(b) by 417 days.

(21) Appl. No.: 18/210,825

(22) Filed: Jun. 16, 2023

(65) Prior Publication Data

US 2023/0406681 A1    Dec. 21, 2023

(30) Foreign Application Priority Data

Jun. 17, 2022  (CN) .......................... 202221512721.7
Jun. 17, 2022  (CN) .......................... 202221512722.1

(51) Int. Cl.
| | |
|---|---|
| *G06V 10/25* | (2022.01) |
| *B66F 9/075* | (2006.01) |
| *G01S 17/89* | (2020.01) |
| *G06V 20/56* | (2022.01) |

(52) U.S. Cl.
CPC ............ *B66F 9/0755* (2013.01); *G01S 17/89* (2013.01); *G06V 10/25* (2022.01); *G06V 20/56* (2022.01); *G06V 2201/07* (2022.01)

(58) Field of Classification Search
CPC ....... B66F 9/0755; G06V 10/25; G06V 20/56; G06V 2201/07; G01S 17/89
See application file for complete search history.

(56) References Cited

U.S. PATENT DOCUMENTS

| | | |
|---|---|---|
| 7,010,404 B2 | 3/2006 | Ichijo et al. |
| 2016/0090285 A1 | 3/2016 | Svensson et al. |
| 2018/0134531 A1 | 5/2018 | Tanaka et al. |
| 2022/0177222 A1 | 6/2022 | Ji |

FOREIGN PATENT DOCUMENTS

| | | |
|---|---|---|
| CN | 107428518 A | 12/2017 |
| EP | 2573041 B1 | 3/2013 |
| JP | H0264596 U | 5/1990 |
| JP | 2003212489 A | 7/2003 |

(Continued)

OTHER PUBLICATIONS

JP2023099787—Notice of Reasons for Refusal mailed on Dec. 10, 2024, 15 pages.

(Continued)

*Primary Examiner* — Mathew Franklin Gordon
(74) *Attorney, Agent, or Firm* — Getech Law LLC; Jun Ye

(57) ABSTRACT

An apparatus for identification and positioning and a cargo transportation apparatus are provided in the disclosure. The apparatus for identification and positioning includes a mounting member and a first detection member. The mounting member is configured to be connected to a handling member of a cargo transportation device. The first detection member is configured to identify and position a cargo or the cargo transportation device. According to the apparatus for identification and positioning and the cargo transportation apparatus provided in the disclosure, the cargo or the cargo transportation device can be automatically positioned with the first detection member.

20 Claims, 14 Drawing Sheets

(56) References Cited

FOREIGN PATENT DOCUMENTS

| | | | |
|---|---|---|---|
| JP | 2003267693 | A | 9/2003 |
| JP | 2021066576 | A | 4/2021 |
| JP | 2021195247 | A | 12/2021 |

OTHER PUBLICATIONS

EP23179886.9—Extended European Search Report mailed on Nov. 21, 2023, 25 pages.
NPLJP2023099787—Notice of Reasons for Refusal mailed on Jun. 28, 2024, 14 pages.

APPARATUS FOR IDENTIFICATION AND POSITIONING AND CARGO TRANSPORTATION APPARATUS

CROSS-REFERENCE TO RELATED APPLICATION(S)

This application claims priority under 35 U.S.C. § 119(a) to and the benefit of Chinese Patent Application No. 202221512722.1, filed Jun. 17, 2022, and Chinese Patent Application No. 202221512721.7 filed Jun. 17, 2022, the entire disclosures of both of which are hereby incorporated by reference.

TECHNICAL FIELD

This disclosure relates to the technical field of identification and positioning, and in particular, to an apparatus for identification and positioning and a cargo transportation apparatus.

BACKGROUND

With the development of technologies, use of automatic industrial production is increasingly wide. Industrial automation is to reduce manual operations as much as possible and fully utilize various information and energy sources other than human resources to operate, in the entire industrial production.

Cargo transportation devices are commonly used in cargo transportation. The cargo transportation device is a wheeled transportation vehicle for loading and unloading, stacking, and short-distance transportation of packaged cargoes. Regardless of whether to load, unload, or stack the cargo, the cargo transportation device can pick up the cargo with a handling member of the cargo transportation device, such as a fork of the cargo transportation device, thereby realizing pickup and unloading of the cargo. However, at present, when the cargo transportation device picks up the cargo with the handling member, the cargo or the cargo transportation device still needs to be manually positioned, resulting in low efficiency of pickup and unloading of the cargo transportation device for the cargo.

SUMMARY

An apparatus for identification and positioning is provided in a first aspect of the disclosure. The apparatus for identification and positioning includes a mounting member and a first detection member. The mounting member is configured to be connected to a handling member of a cargo transportation device. The first detection member is disposed on the mounting member and configured to identify and position a cargo or the cargo transportation device.

A cargo transportation apparatus is provided in a second aspect of the disclosure. The cargo transportation apparatus includes a cargo transportation device and an apparatus for identification and positioning. The cargo transportation device includes a handling member and a vehicle body. The handling member is slidably connected to the vehicle body. The handling member is moveable in a vertical direction relative to the vehicle body. The apparatus for identification and positioning includes a mounting member and a first detection member. The mounting member is connected to the handling member of the cargo transportation device. The first detection member is disposed on the mounting member and configured to identify and position a cargo or the cargo transportation device.

DESCRIPTION OF REFERENCE SIGNS OF ACCOMPANYING DRAWINGS

Figure 1:
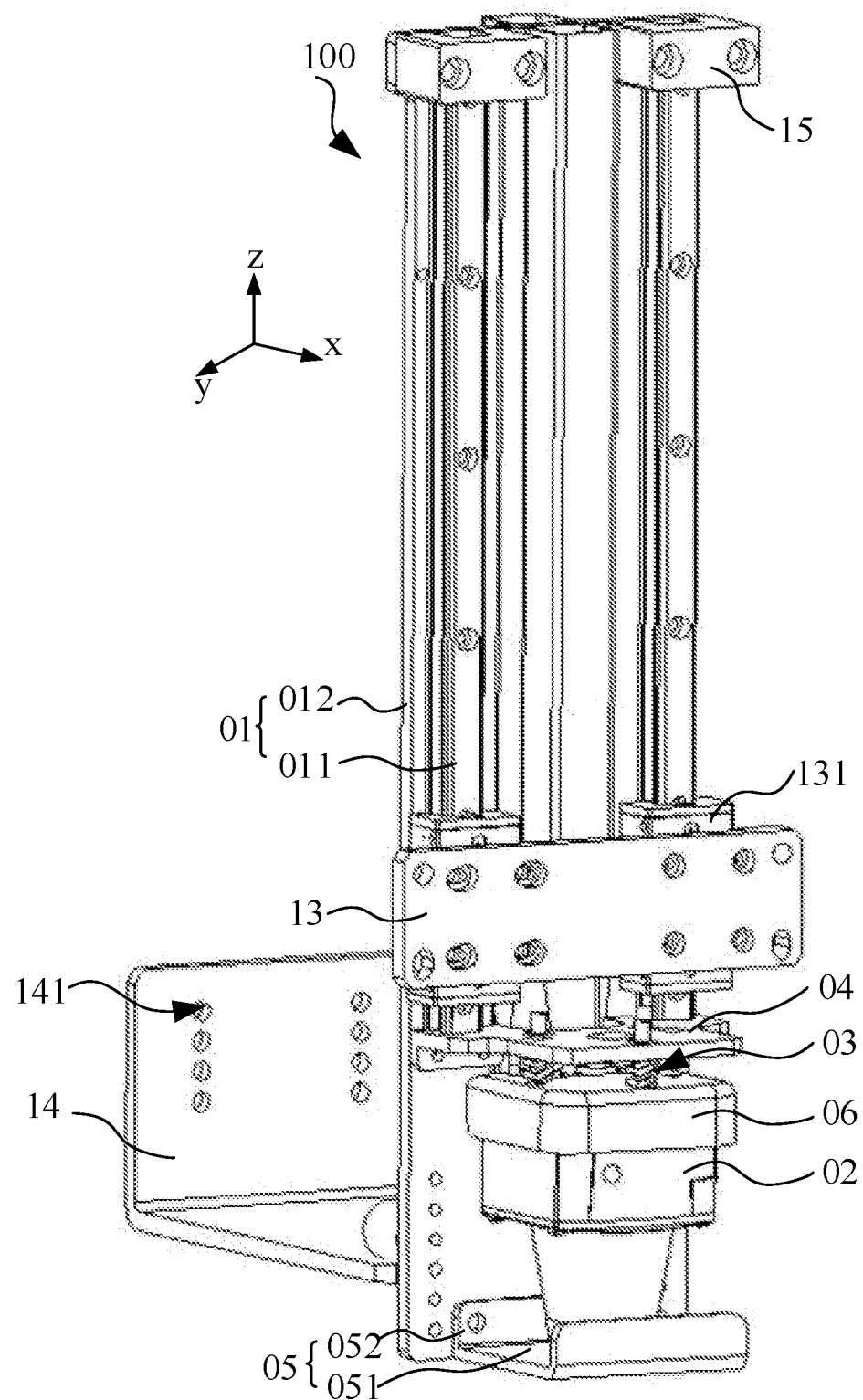
FIG. 1 is a schematic structural view of an apparatus for identification and positioning provided in implementations of the disclosure.

100: apparatus for identification and positioning;
01: mounting member; 011: sliding rail; 012: mounting-member body; 013: abutment portion;
02: first detection member;
03: floating mechanism; 031: elastic member; 0032: guiding member;
04: positioning member; 041: connection portion; 042: positioning portion;
05: first protective member; 051: protective plate; 052: rib;
06: second protective member;
07: second detection member; 071: second-detection-member body; 072: sub-holder; 0721: second connection hole; 07211: first projection; 0722: second adjustment hole; 07221: fourth projection;

08: first holder; 081: support arm; 0811: first connection hole; 08111: second projection; 0812: first adjustment hole; 08121: third projection; 082: connection arm; 083: first adjustment member; 084: connection member;

09: first support frame; 091: fourth adjustment hole; 092: second adjustment member; 093: fourth connection hole;

10: second holder; 101: third adjustment hole; 1011: fifth projection;

11: second support frame; 111: third connection hole; 1111: sixth projection;

12: light supplementing member;

13: connection plate; 131: sliding block;

14: fixing member; 141: fixing hole;

15: anti-falling block;

16: drag chain;

200: cargo transportation device; 210: handling member; 220: vehicle body; 230: fork frame;

1000: cargo transportation apparatus;

a: first rotation axis; b: second rotation axis; R1: first reference surface; R2: second reference surface.

DETAILED DESCRIPTION

In order to make the above purposes, features, and advantages of the disclosure move obvious and understandable, specific implementations of the disclosure will be described in detail with reference to accompanying drawings. In the following illustration, many specific details are elaborated to fully understand the disclosure. However, the disclosure can be implemented in many other ways different from those described herein, and those of ordinary skill in the art can make similar modifications without departing from a spirit of the disclosure. Therefore, the disclosure is not limited by specific implementations disclosed below.

In illustration of the disclosure, it should be understood that orientations or position relationships indicated by terms such as "center", "longitudinal", "lateral", "length", "width", "thickness", "on", "under", "front", "back", "left", "right", "vertical", "horizontal", "top", "bottom", "in", "out", "clockwise", "anticlockwise", "axial", "radial", "circumferential", and the like are orientations or position relationships based on accompanying drawings and are only for the convenience of illustration of the specification and simplicity of illustration, rather than explicitly or implicitly indicate that apparatuses or components referred to herein must have a certain direction or be configured or operated in a certain direction and therefore cannot be understood as limitations to the disclosure.

In addition, terms "first", "second", and the like are only used for illustration and cannot be understood as explicitly or implicitly indicating relative importance or implicitly indicating the number of technical features referred to herein. Therefore, features restricted by terms "first", "second", and the like can explicitly or implicitly include at least one of the features. In the context of the disclosure, "multiple" refers to "at least two", such as two, three, and the like, unless stated otherwise.

In the disclosure, unless stated and limited otherwise, terms "installing", "coupling", "connecting", "fixing", and the like referred to herein should be understood in broader sense. For example, coupling may be a fixed coupling, a removable coupling, or an integrated coupling, may be a mechanical coupling, an electrical coupling, and may be a direct coupling, an indirect coupling through a medium, or a communication coupling between two components or an interaction coupling between two components, unless limited otherwise. For those of ordinary skill in the art, the above terms in the disclosure can be understood according to specific situations.

In the disclosure, unless stated otherwise, a first feature being "on" or "under" a second feature referred to herein can refer to a direct contact between the first feature and the second feature or an indirect contact between the first feature and the second feature via a medium. In addition, the first feature being "above", "over", and "on" the second feature can be the first feature being right above or obliquely above the second feature or only refers to the first feature being at a higher horizontal level than the second feature. The first feature being "below", "underneath", and "under" the second feature can be the first feature being right below or obliquely below the second feature or only refers to the first feature being at a lower horizontal level than the second feature.

It needs to be noted that when an element is referred to as being "fixed to" or "disposed at" another element, the element may be directly on another element or intervening elements may also be present. When one element is referred to as being "coupled" or "connected" to another element, it can be directly coupled or connected to the other element or intervening elements may also be present. The terms "vertical", "horizontal", "upper", "lower", "left", "right" and similar expressions as used herein are for illustrative purposes only and are not meant to be the only implementation.

In addition, the drawings are not drawn to scale of 1:1, and relative sizes of elements are exemplarily drawn in the drawings, and not necessarily drawn to actual scale.

For the convenience of illustration, the accompanying drawings only illustrate structures related to implementations of the disclosure.

Figure 2:
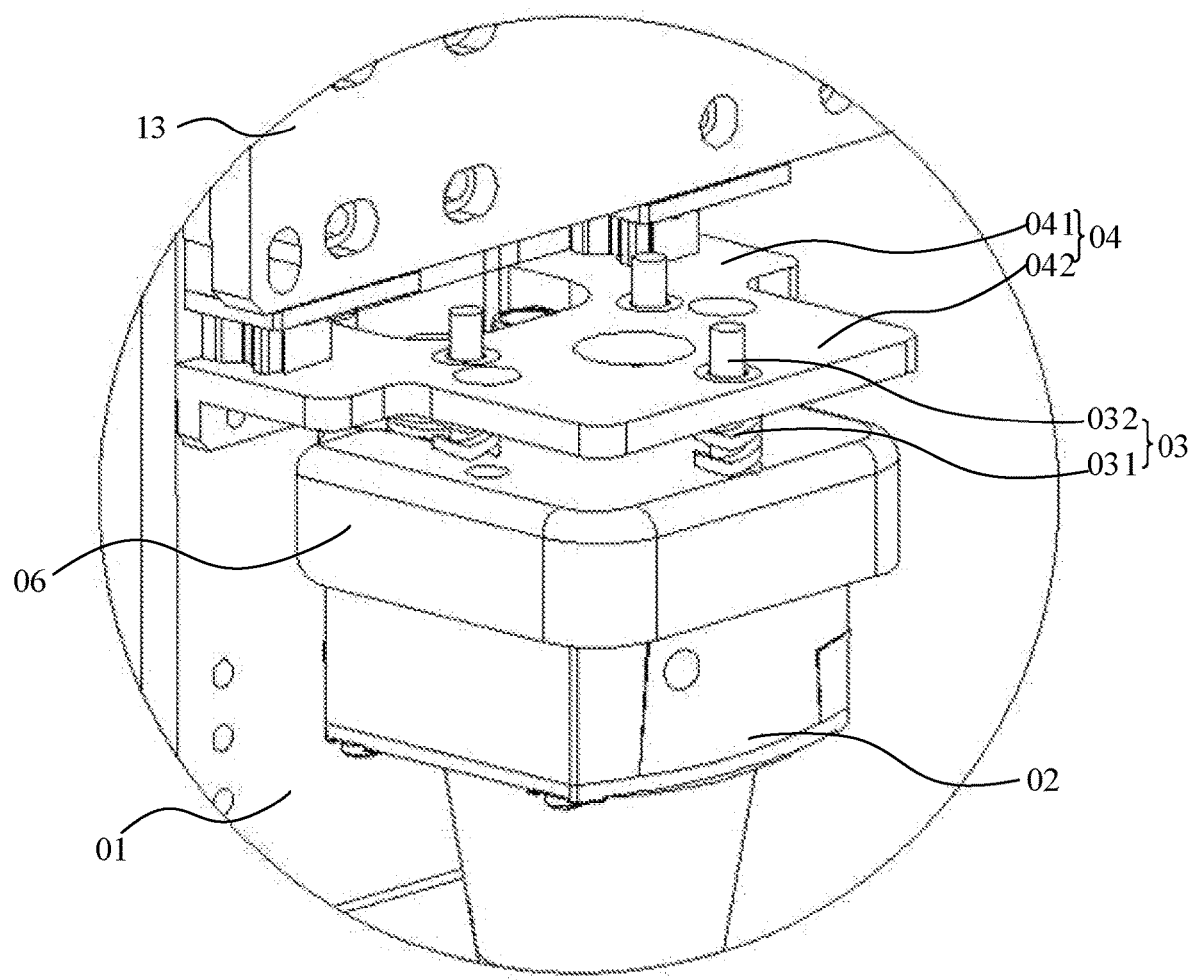
FIG. 2 is a partial schematic structural view of an apparatus for identification and positioning provided in implementations of the disclosure.
Figure 11:
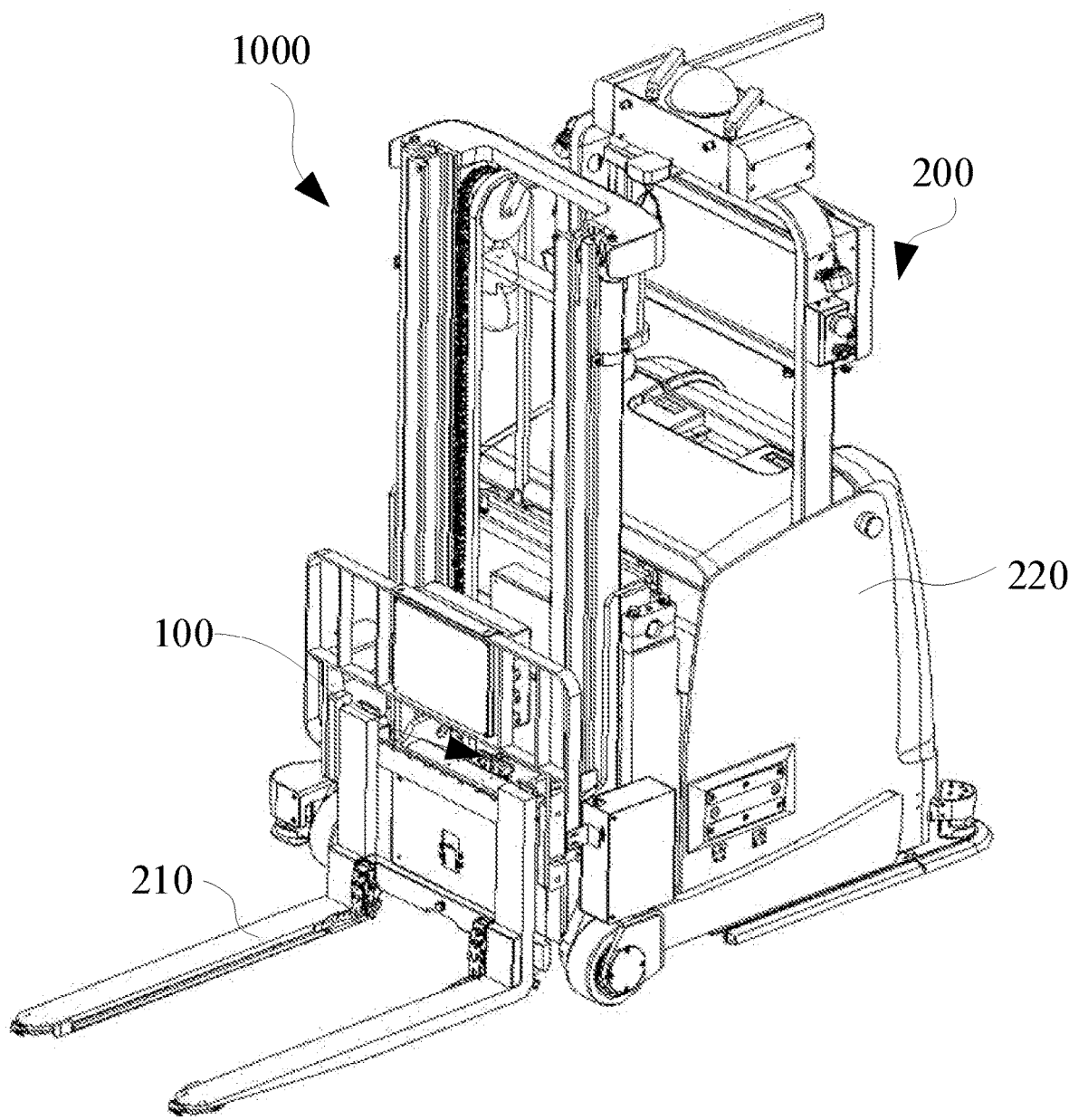
FIG. 11 is a schematic structural view of a cargo transportation apparatus provided in implementations of the disclosure.

FIG. 1 illustrates a schematic structural view of an apparatus 100 for identification and positioning in implementations of the disclosure. FIG. 2 illustrates a partial schematic structural view of the apparatus 100 for identification and positioning in implementations of the disclosure. FIG. 11 is a schematic structural view of a cargo transportation apparatus 1000 provided in implementations of the disclosure. As illustrated in FIGS. 1, 2, and 11, the apparatus 100 for identification and positioning is provided in implementation of the disclosure. The apparatus 100 for identification and positioning includes a mounting member 01 and a first detection member 02. The mounting member 01 is configured to be connected to a handling member 210 of a cargo transportation device 200. The first detection member 02 is configured to identify and position a cargo or the cargo transportation device 200.

The above apparatus 100 for identification and positioning includes the mounting member 01 and the first detection member 02. The mounting member 01 is configured to be connected to the handling member 210 of the cargo transportation device 200. The first detection member 02 is configured to identify and position the cargo or the cargo transportation device 200. As such, the cargo or the cargo transportation device 200 can be automatically positioned with the first detection member 02, thereby reducing manual operations and improving efficiency of pickup and unloading of the cargo transportation apparatus 1000 for the cargo.

The above cargo transportation device 200 further includes a vehicle body 220. The handling member 210 is slidably connected to the vehicle body 220. The handling member 210 is movable in a vertical direction (i.e., z-axis direction in FIG. 1) relative to the vehicle body 220. In some implementations, the apparatus 100 for identification and positioning further includes a floating mechanism 03 connected between the first detection member 02 and the mounting member 01. The floating mechanism 03 enables the first detection member 02 to float in the vertical direction relative to the mounting member 01.

At present, the cargo transportation device 200 includes the handling member 210 and the vehicle body 220. The handling member 210 is slidably connected to the vehicle body 220. The handling member 210 is moveable in the vertical direction relative to the vehicle body 220. When the cargo transportation device 200 picks up the cargo with the handling member 210, movement of the handling member 210 relative to the vehicle body 220 may drive the first detection member 02 to move relative to the vehicle body 220, which results in that the first detection member 02 may be damaged by a certain impact force, and further results in that the first detection member 02 is difficult to accurately identify the cargo. With the apparatus 100 for identification and positioning provided in the disclosure, when the handling member 210 drives the first detection member 02 to move in the vertical direction relative to the vehicle body 220 and thus the first detection member 02 is damaged due to the impact force, since the floating mechanism 03 is arranged between the mounting member 01 and the first detection member 02, the floating mechanism 03 enables the first detection member 02 to float in the vertical direction relative to the mounting member 01. As such, an external impact force acting directly on the first detection member 02 can be weakened by buffering via the floating mechanism 03, thereby preventing the first detection member 02 from being damaged, and improving identification accuracy of the first detection member 02 for the cargo or the cargo transportation device 200.

Figure 12:
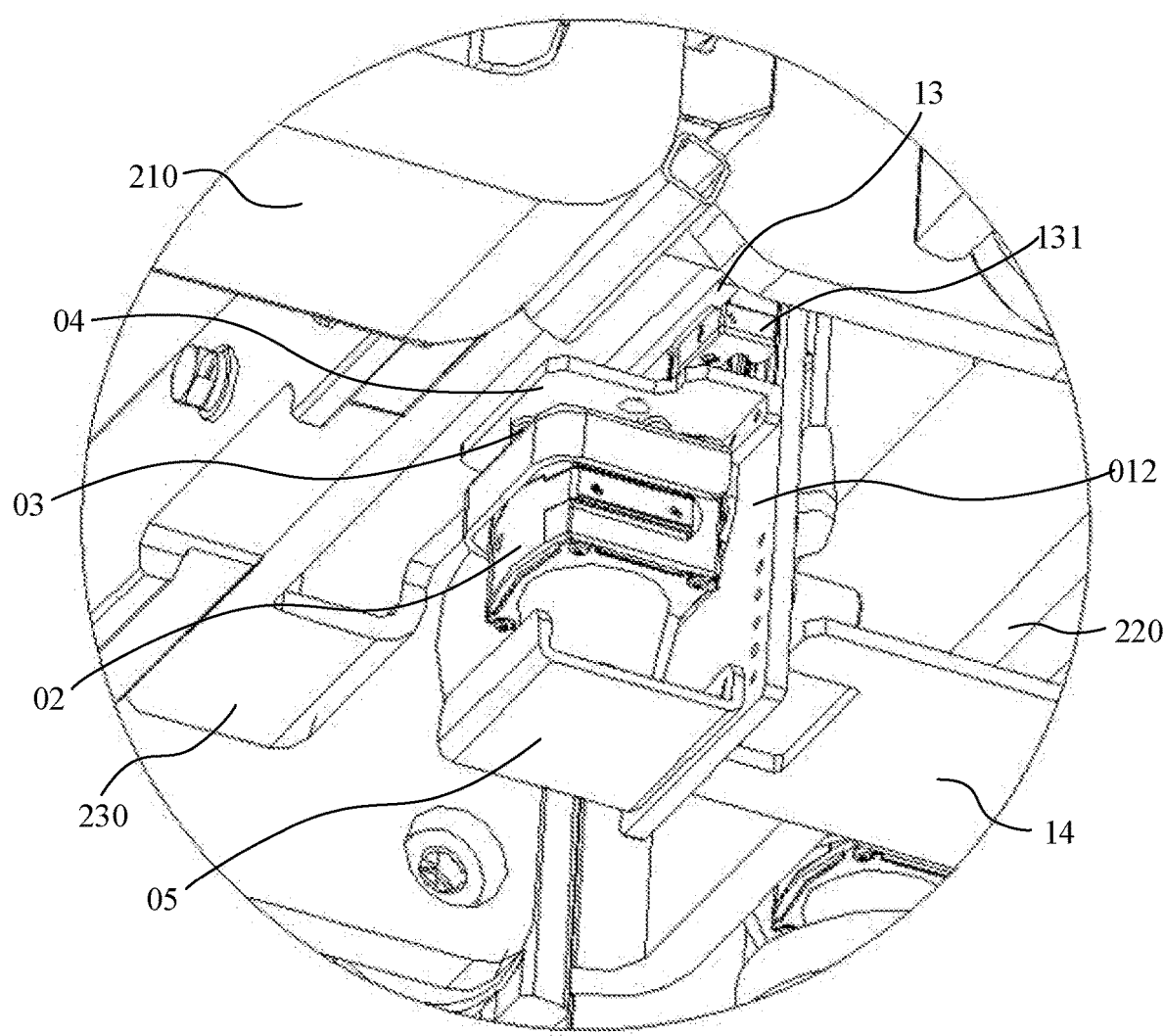
FIG. 12 is a schematic installation view of an apparatus for identification and positioning provided in implementations of the disclosure.

It needs to be noted that, the vertical direction in implementations of the disclosure refers to a length direction of the mounting member 01, and may also be understood as a movement direction of the handling member 210. The apparatus 100 for identification and positioning in the disclosure can be mounted on the cargo transportation device 200. It needs to be further noted that the handling member 210 in the disclosure includes a fork. Specifically, referring to FIG. 12, FIG. 12 is a schematic installation view of an apparatus for identification and positioning provided in implementations of the disclosure. The cargo transportation device 200 further includes a fork frame 230 slidably connected to the vehicle body 220. The fork (namely, the handling member 210) is connected to the fork frame 230 of the cargo transportation device 200. The fork (namely, the handling member 210) is movable along with the fork frame 230 in the vertical direction relative to the vehicle body 220 of the cargo transportation device 200. The cargo transportation device 200 includes a forklift, a clamp truck, a tractor, a stacker, a reach stacker, a warehousing robot, and the like, which are not limited herein. The cargo includes a carrier such as a mesh pallet, a pallet, etc., and goods carried thereon, which are not limited herein.

Referring to FIG. 2 again, in some implementations, the floating mechanism 03 includes an elastic member 031 elastically abutting between the mounting member 01 and the first detection member 02. In this way, the elastic member 031 abutting between the mounting member 01 and the first detection member 02 may be elastically deformed when the elastic member 031 is subject to an external force, thereby buffering the external force that acts on the first detection member 02, and preventing the first detection member 02 from being damaged. Specifically, in some implementations, the elastic member 031 is a spring. In other implementations, the elastic member 031 may be a rubber member or other components capable of elastic deformation, which is not limited herein.

As illustrated in FIG. 2, in some implementations, the floating mechanism 03 further includes a guiding member 032. One end of the guiding member 032 is connected to one of the mounting member 01 and the first detection member 02, and the other end of the guiding member 032 is slidably connected to the other of the mounting member 01 and the first detection member 02. The guiding member 032 is configured to guide the first detection member 02 to move in the vertical direction relative to the mounting member 01. The elastic member 031 is sleeved on the guiding member 032. In this way, the guiding member 032 can guide an elastic deformation direction of the elastic member 031, and can guide a floating direction of the first detection member 02 relative to the mounting member 01. In some implementations, one end of the guiding member 032 is connected to the first detection member 02, and the other end of the guiding member 032 is slidably connected to the mounting member 01. Furthermore, one end of the guiding member 032 is threadedly connected to the first detection member 02. In this way, the guiding member 032 can be more stably fixed to the first detection member 02 through threaded connection. Optionally, the guiding member 032 includes a bolt assembly.

Referring to FIG. 2 again, in some implementations, the floating mechanism 03 includes is implemented as at least two floating mechanisms 03. The at least two floating mechanisms 03 are spaced apart from each other and arranged between the mounting member 01 and the first detection member 02. In this way, a buffering performance of the first detection member 02 against the external impact force can be further improved with the at least two floating mechanisms 03. In some implementations, an elastic deformation amount of the elastic members 031 of each of the at least two floating mechanisms 03 is adjustable to adjust levelness of the first detection member 02. In this way, a distance between the first detection member 02 and the mounting member 01 can be adjusted by adjusting the elastic deformation amount of the elastic member 031 of the floating mechanism 03, thereby adjusting the levelness of the first detection member 02, enabling that a detection direction of the first detection member 02 is parallel to a preset plane to maintain the levelness of the first detection member 02, preventing the first detection member 02 from inclining relative to the preset plane, and thus avoiding that the first detection member 02 is difficult to accurately identify the cargo. It needs to be noted that, the preset plane is a horizontal plane or a plane perpendicular to the mounting member 01, and the floating mechanism 03 can level the first detection member 02 with the aid of a laser level meter. Furthermore, the floating mechanism 03 is implemented as three floating mechanisms 03, and the three floating mechanisms 03 are arranged in a triangular manner. In this way, the first detection member 02 can be parallel to the preset plane more accurately with the three floating mechanisms 03, thereby ensuring the identification accuracy of the first detection member 02 for the cargo.

Referring to FIG. 1 again, in some implementations, the apparatus 100 for identification and positioning further includes a positioning member 04. The positioning member 04 projects from the mounting member 01, and the floating mechanism 03 is connected between the positioning member 04 and the first detection member 02. Specifically, the positioning member 04 is vertically connected to the mounting member 01. Referring to FIG. 2, in some implementations, the positioning member 04 includes a connection portion 041 and a positioning portion 042. The connection portion 041 is connected to the mounting member 01, and the positioning portion 042 is connected to the connection portion 041. An orthographic projection of the positioning portion 042 in the vertical direction covers an orthographic projection of the first detection member 02 in the vertical direction. That is, the orthographic projection of the positioning portion 042 on the plane perpendicular to the mounting member 01 covers the orthographic projection of the first detection member 02 on the plane perpendicular to the mounting member 01. Specifically, the floating mechanism 03 is connected between the positioning portion 042 and the first detection member 02. In implementations illustrated in FIG. 2, the three floating mechanisms 03 are arranged in a triangular manner on the positioning portion 042. In this way, the positioning portion 042 can adapt to the arrangement of the floating mechanisms 03, and the positioning portion 042 can also protect the first detection member 02 from the impact force in the vertical direction. More specifically, there are multiple connection portions 041 arranged at intervals. In this way, the positioning portion 042 can be fixed at multiple positions with the multiple connection portions 041, thereby ensuring stability of the positioning portion 042. In implementations of the disclosure, there are two connection portions 041.

Referring to FIG. 1 again, in some implementations, the apparatus 100 for identification and positioning further includes a first protective member 05. The first protective member 05 is connected to the mounting member 01 and disposed at a bottom of the first detection member 02. In this way, when the apparatus 100 for identification and positioning moves down along with the handling member 210, the first detection member 02 can be prevented from colliding with the ground via the first protective member 05, thereby protecting the first detection member 02. In some implementations, the first protective member 05 includes a protective plate 051. An orthographic projection of the protective plate 051 in the vertical direction covers the orthographic projection of the first detection member 02 in the vertical direction. That is, the orthographic projection of the protective plate 051 on the plane perpendicular to the mounting member 01 covers the orthographic projection of the first detection member 02 on the plane perpendicular to the mounting member 01. In this way, the protective plate 051 having a larger area can better protect the first detection member 02 from colliding with the ground. Furthermore, the first protective member 05 further includes a rib 052 disposed at one side of the protective plate 051. The rib 052 is perpendicularly connected to the protective plate 051 and is connected to the mounting member 01. In this way, the first protective member 05 can be more stably connected to the mounting member 01 with the rib 052. In implementations of the disclosure, the first protective member 05 includes two ribs 052 that are spaced apart from each other, and arranged at two sides of the protective plate 051, respectively.

As illustrated in FIG. 1, in some implementations, the apparatus 100 for identification and positioning further includes a second protective member 06. The second protective member 06 covers the first detection member 02. Specifically, the second protective member 06 covers and is fixedly connected to a top of the first detection member 02, and the guiding member 032 passes through the positioning member 04 and the second protective member 06 in sequence to be fixedly connected to the first detection member 02. In this way, the first detection member 02 can be further protected by the second protective member 06 covering the first detection member 02. In some implementations, the second protective member 06 defines a protective cavity, and the first detection member 02 is at least partially received in the protective cavity, specifically, the top of the first detection member 02 is received in the protective cavity. In this way, with the protective cavity, the first detection member 02 can be protected from an acting force from a peripheral side of the first detection member 02, thereby improving a protective capability of the first detection member 02. More specifically, a shape of an inner profile of the protective cavity adapts to a shape of an outer profile of the first detection member 02. As such, effective protection of the first detection member 02 can be ensured, the waste of materials can be avoided, costs can be reduced, and weakening of protective effect caused by the shape of the inner profile of the protective cavity not adapting to the shape of the outer profile of the first detection member 02 can be avoided. In implementations of the disclosure, the shape of the inner profile of the protective cavity is square, the shape of the outer profile of the top of the first detection member 02 is square, and the inner profile of the protective cavity adapts to the outer profile of the top of the first detection member 02.

Referring to FIG. 1 again, in some implementations, the first detection member 02 includes a laser scanner. The laser scanner is also known as a LIDAR. The laser scanner is configured to identify point cloud information of the cargo and/or the cargo transportation device 200. The point cloud information is a dataset, and each data point in the dataset represents a geometric coordinate of three dimensions (X, Y, Z) and an intensity value, where the intensity value is an intensity of a returned signal recorded according to an object surface reflectance. When these data points are combined together, the point cloud information, i.e., a set of data points in space representing a 3-dimensional (3D) shape or object, is formed. Optionally, the laser scanner may be a 2-dimensional (2D) laser scanner or a 3D laser scanner. In some other implementations, the first detection member 02 includes a camera. The camera is configured to identify image information of the cargo and/or the cargo transportation device 200. Optionally, the camera may be a 2D camera or a 3D camera. The image information may include a 2D image or a 3D image.

Figure 3:
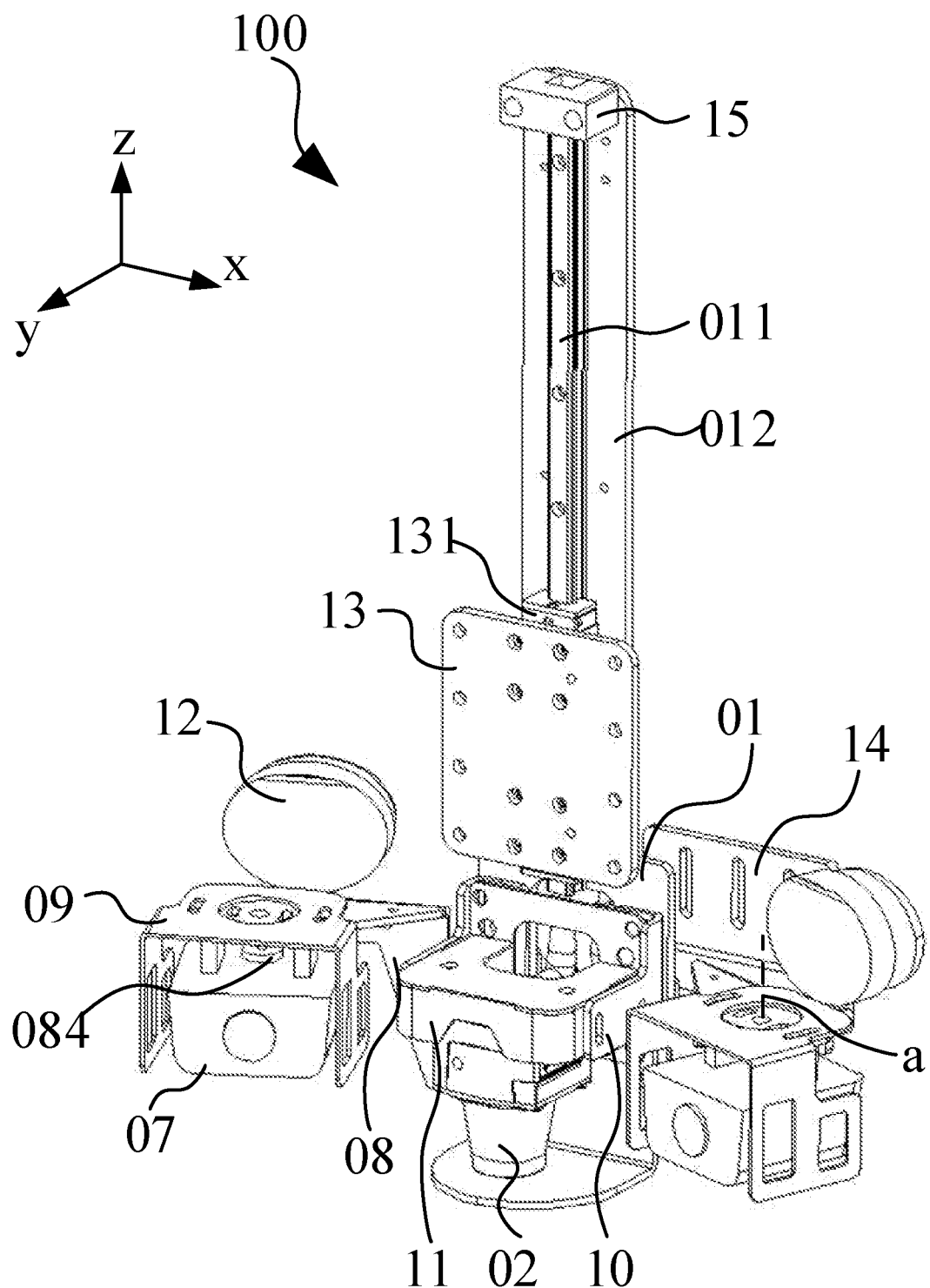
FIG. 3 is a schematic structural view of an apparatus for identification and positioning provided in other implementations of the disclosure.

FIG. 3 illustrates a schematic structural view of an apparatus 100 for identification and positioning in other implementations of the disclosure. Referring to FIG. 3, an apparatus 100 for identification and positioning is provided in other implementations of the disclosure. The apparatus 100 for identification and positioning includes a mounting member 10, a first detection member 02, and a second detection member 07. The mounting member 10 is configured to be connected to a handling member 210 of a cargo transportation device 200. The first detection member 02 and the second detection member 07 spaced apart from each other are disposed on the mounting member 10. The first detection member 02 is configured to identify point cloud information of a cargo and/or the cargo transportation device 200, and the second detection member 07 is configured to identify image information of the cargo and/or the cargo transportation device 200.

To further expand a range of cargos obtained, and further solve a problem that accuracy of identification and positioning for the cargo is difficult to be improved because information of cargo can be obtained from only a single dimension, the apparatus 100 for identification and positioning is provided in other implementations of the disclosure. The first detection member 02 identifies the point cloud information of the cargo and/or the cargo transportation device 200, and at least one second detection member 07 identifies the image information of the cargo and/or the cargo transportation device 200. In this way, acquisition of information of the cargo and/or the cargo transportation device 200 is facilitated through integrated mounting and cooperative use of the first detection member 02 and the second detection member 07. Meanwhile, a pose of the cargo can be checked through results identified and positioned by the first detection member 02 and the second detection member 07, thereby improving positioning accuracy of the apparatus 100 for identification and location for the cargo.

Specifically, in a cargo stacking or transportation scenario, the first detection member 02 and the second detection member 07 (for example, two cameras) perform region of interest (ROI) extraction and feature labeling on a photographed image, and trains labeled image data with a deep learning model, to identify a target object in the ROI. The target object described above includes a cargo stacked and a cargo to-be-stacked. The cargo to-be-stacked is a cargo on the handling member 210 (for example, a fork), and the cargo stacked is an already stacked cargo waiting for a cargo on the fork to be stacked on the already stacked cargo. Whether a pose deviation between the cargo stacked and the cargo to-be-stacked on the fork exceeds a preset range is calculated and determined with the deep learning model, and if the pose deviation does not exceed the preset range, the cargo to-be-stacked on the fork will be stacked on the cargo stacked. Specifically, in implementations of the disclosure, the apparatus 100 for identification and positioning may be an automated guided vehicle (AGV). In practical applications, the AGV drives to a designated position according to a pose issued, and obtains size (e.g., length and width) and coordinate information of a detection frame of a target object by detecting all target objects (including the cargo stacked and the cargo to-be-stacked) in the ROI. A perception module of the AGV selects out the target object in the ROI according to the information obtained, and determines whether to stack the cargo to-be-stacked according to a state of the ROI. In implementations of the disclosure, the state of the ROI includes: the cargo stacked or the cargo to-be-stacked being detected in the ROI, whether the pose deviation between the cargo stacked and the cargo to-be-stacked in the ROI exceeds the preset range, or no cargo stacked or no cargo to-be-stacked being detected in the ROI.

For another example, in the cargo stacking or transportation scenario, the first detection member 02 and the second detection member 07 (for example, two cameras) perform ROI extraction and feature labeling on a photographed image, and trains labeled image data with the deep learning model, to identify a target object in the ROI. The target object described above includes a cargo stacked and a cargo to-be-stacked. The cargo to-be-stacked is a cargo on the handling member 210 (for example, a fork), and the cargo stacked is an already stacked cargo waiting for a cargo on the fork to be stacked on the already stacked cargo. Whether a horizontal coordinate of the cargo stacked and the cargo to-be-stacked on the fork exceeds the preset range is calculated and determined with the deep learning model, to determine whether the cargo slides. In practical applications, the AGV drives to the designated position according to the pose issued, and obtains size (e.g., length and width) and coordinate information of a detection frame of a target object by detecting all target objects (including the cargo stacked and the cargo to-be-stacked) in the ROI. The perception module of the AGV selects out the target object in the ROI according to the information obtained, and determines whether the cargo (i.e., the cargo stacked and/or the cargo to-be-stacked) slides according to the state of the ROI. In implementations of the disclosure, the state of the ROI includes: the cargo stacked or the cargo to-be-stacked being detected in the ROI, whether the horizontal coordinate of the cargo stacked or the cargo to-be-stacked in the ROI exceeds the preset range, or no cargo stacked or no cargo to-be-stacked being detected in the ROI.

Finally, the AGV feeds back a detection result to a central-control scheduling system that is in communication connection with the AGV, and the central-control scheduling system schedules the AGV to operate.

The apparatus 100 for identification and positioning in the disclosure can be mounted on the cargo transportation device 200. The handling member 210 in the disclosure is, for example, a fork. Specifically, the cargo transportation device 200 further includes a vehicle body 220 and a fork frame 230 slidably connected to the vehicle body 220. The fork (namely, the handling member 210) is connected to the fork frame 230 of the cargo transportation device 200. The fork is moveable along with the fork frame 230 in the vertical direction (i.e., the z-axis direction in FIG. 3) relative to the vehicle body 220 of the cargo transportation device 200. The cargo transportation device 200 includes a forklift, a clamp truck, a tractor, a stacker, a reach stacker, a warehousing robot, and the like, which are not limited herein. The cargo includes a carrier such as a mesh pallet, a pallet, etc., and goods carried thereon, which are not limited herein.

In some implementations, the apparatus 100 for identification and positioning illustrated in FIG. 3 may further include a floating mechanism 03. For arrangement of the floating mechanism 03, reference can be made to the implementations corresponding to FIG. 1 and FIG. 2, which will not be repeated herein.

In some implementations, the apparatus 100 for identification and positioning includes multiple second detection members 07. The multiple second detection members 07 are spaced apart from each other and disposed on the mounting member 01.

In some implementations, the multiple second detection members 07 are disposed at two opposite sides of the first detection member 02, respectively. In this way, the multiple second detection members 07 can perform supplementary image acquisition on cargos at the two sides of the first detection member 02, and position distribution of the multiple second detection members 07 is more reasonable. In some implementations, for example, in FIG. 3, there are two second detection members 07 centered on the first detection member 02 and symmetrically arranged at the two opposite sides of the first detection member 02. In this way, the two second detection members 07 can simplify a structure of the apparatus 100 for identification and positioning, and costs can be saved.

As illustrated in FIG. 3, in some implementations, the second detection member 07 is configured to be rotatably adjustable relative to the mounting member 10. In this way, an angle of the second detection member 07 can be adjusted by the second detection member 07 that is rotatably adjustable, according to an actual position of the cargo, so that image acquisition of the cargo by the second detection member 07 is more accurate.

Figure 4:
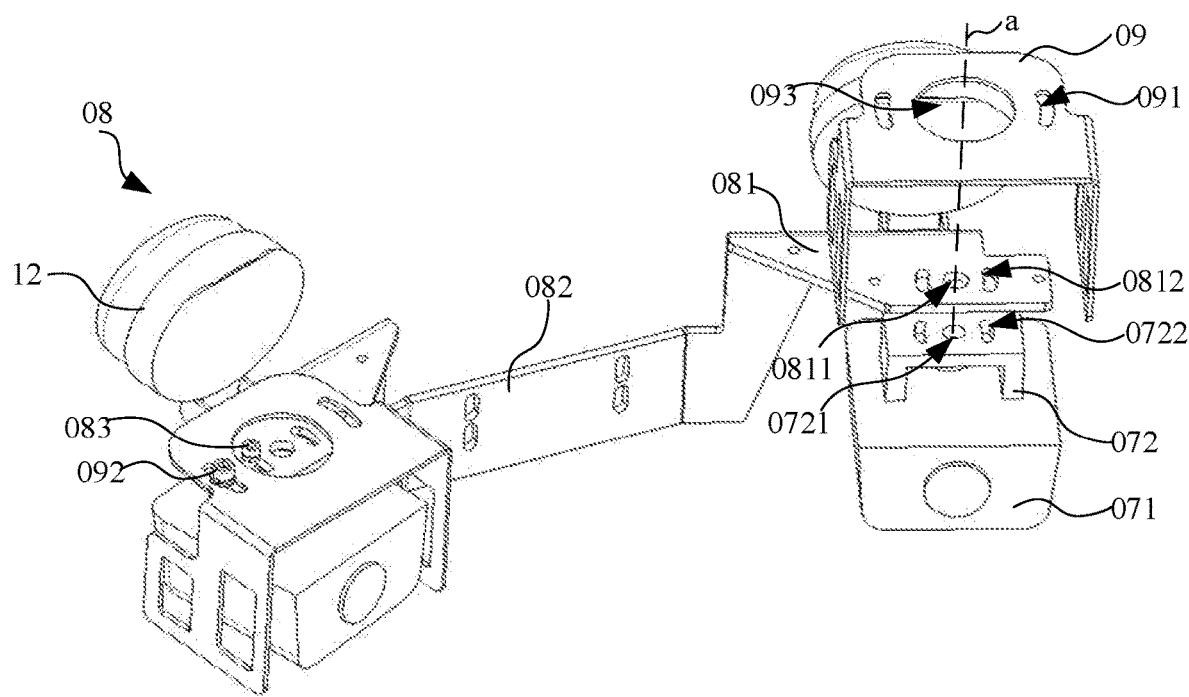
FIG. 4 is an exploded schematic structural view of a first holder provided in implementations of the disclosure.

Referring to FIG. 4, in conjunction with FIG. 3, FIG. 4 is an exploded schematic structural view of a first holder 08 provided in implementations of the disclosure. In some implementations, the apparatus 100 for identification and positioning further includes the first holder 08 and a connection member 084. The first holder 08 includes a connection arm 082 and a support arm 081 connected to the connection arm 082. The connection arm 082 is connected to the mounting member 01. The second detection member 07 includes a second-detection-member body 071 and a sub-holder 072 connected to the second-detection-member body 071. The support arm 081 defines a first connection hole 0811, and the sub-holder 072 defines a second connection hole 0721. The connection member 084 is configured to pass through the first connection hole 0811 and the second connection hole 0721, and the support arm 081 is rotatably connected with the sub-holder 072 via the connection member 084. In this way, relative rotation between the support arm 081 and the sub-holder 072 is achieved via the first connection hole 0811, i.e., it is realized that the second detection member 07 can rotate relative to the support arm 081. In some implementations, there are multiple support arms 081 and multiple connection members 084. The multiple connection members 084 are in one-to-one correspondence with the multiple support arms 081, and the multiple connection members 084 are in one-to-one correspondence with the multiple second detection members 07. More specifically, the sub-holder 072 is mounted at the bottom of the support arm 081. Optionally, the connection member 084 may be a rod-shaped structure (such as a pin shaft). In implementations of the disclosure, each of the first connection hole 0811 and the second connection hole 0721 is a circular hole.

Figure 5:
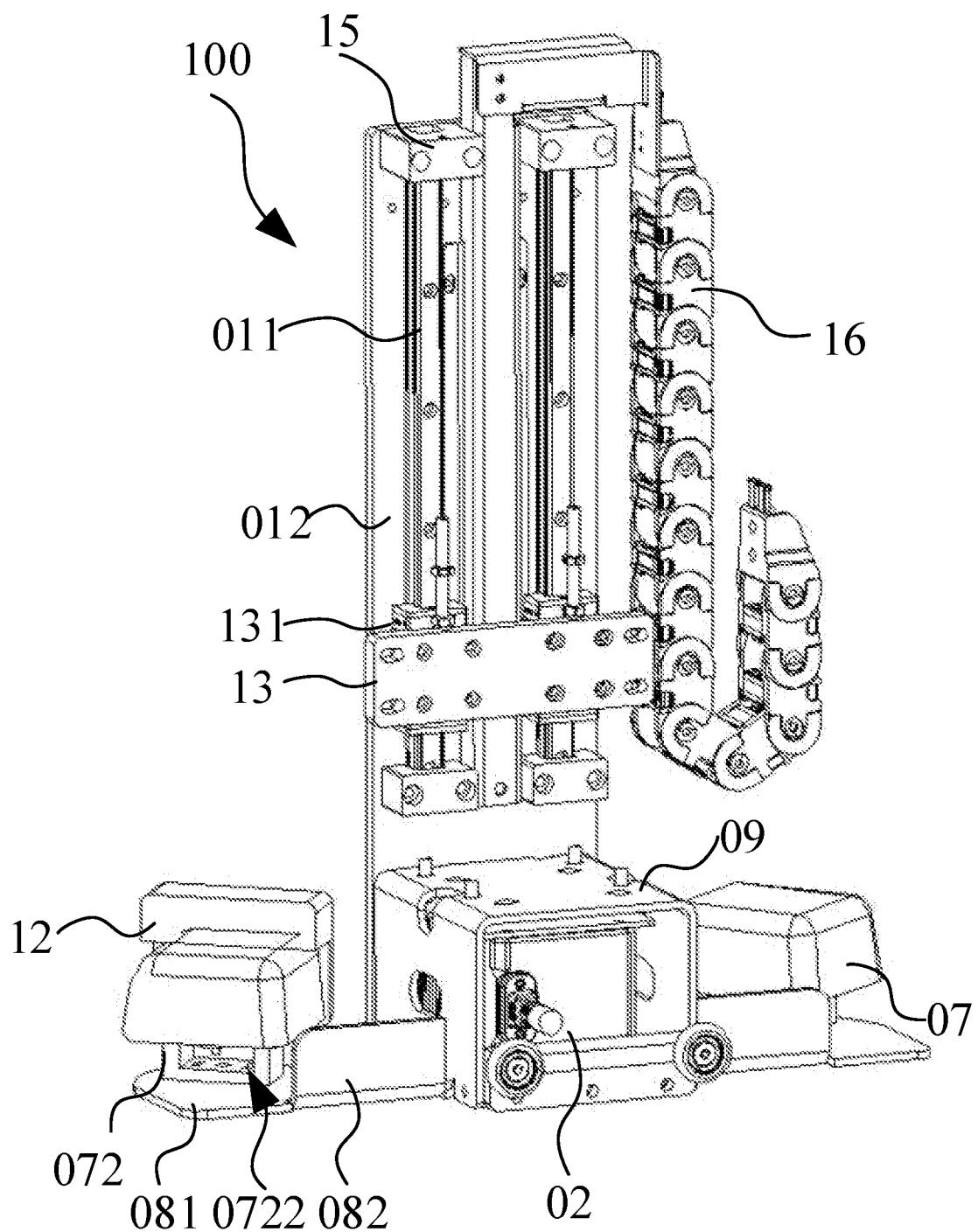
FIG. 5 is a schematic structural view of an apparatus for identification and positioning provided in other implementations of the disclosure.
Figure 6:
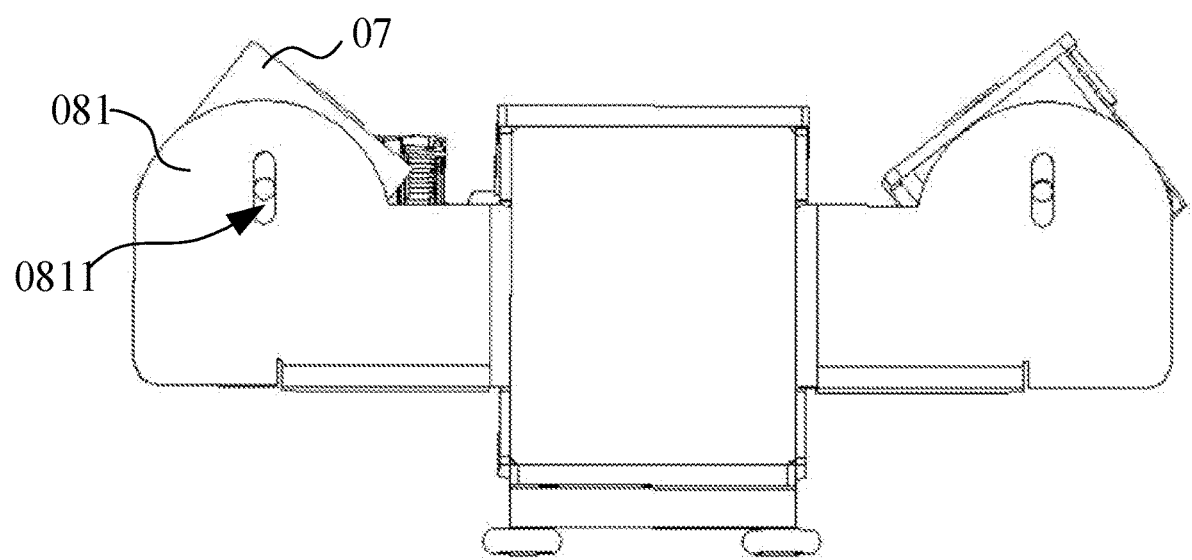
FIG. 6 is a bottom view of an apparatus for identification and positioning provided in other implementations of the disclosure.
Figure 7:
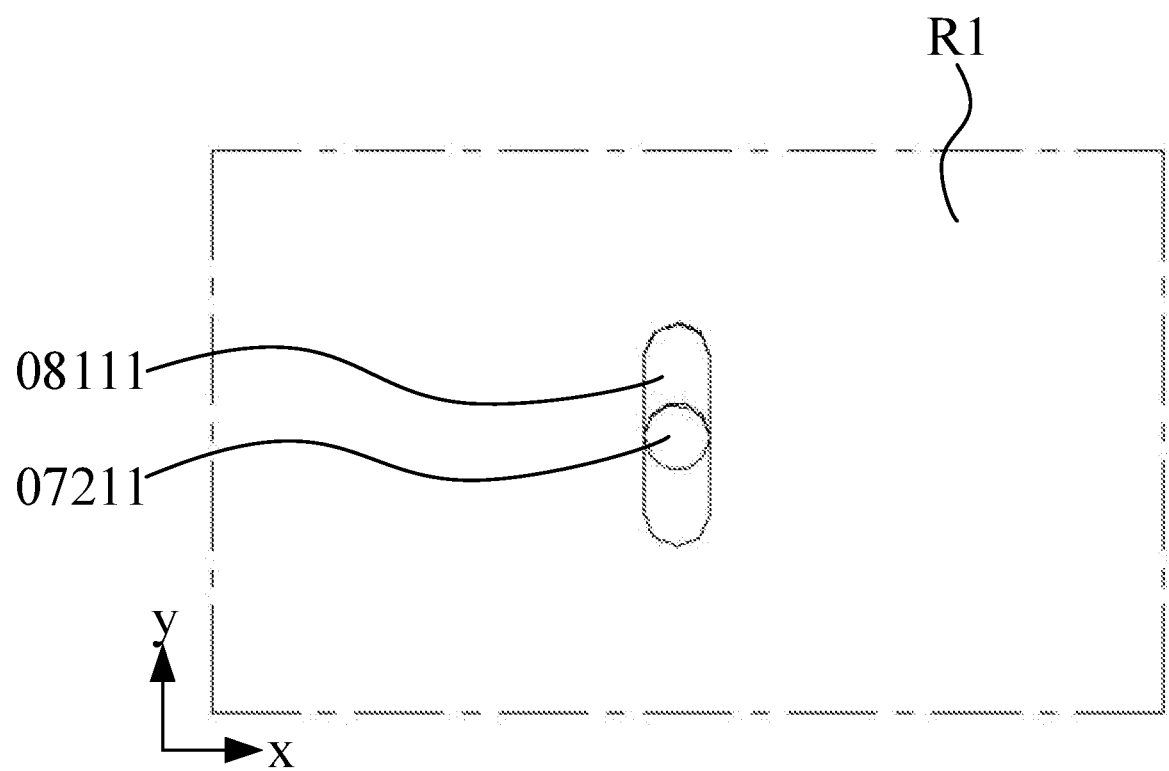
FIG. 7 is a schematic diagram of a first projection and a second projection provided in implementations of the disclosure.

Referring to FIGS. 4, 5, 6, and 7, FIG. 5 illustrates a schematic structural view of an apparatus 100 for identification and positioning provided in other implementations of the disclosure, FIG. 6 illustrates a bottom view of an apparatus 100 for identification and positioning provided in other implementations of the disclosure, and FIG. 7 illustrates a schematic diagram of a first projection 07211 and a second projection 08111 provided in implementations of the disclosure. In some implementations, as illustrated in FIG. 4, the second detection member 07 has a first rotation axis a. A plane perpendicular to the first rotation axis a is defined as a first reference plane R1. An orthographic projection of the second connection hole 0721 on the first reference plane R1 is defined as the first projection 07211, and an orthographic projection of the first connection hole 0811 on the first reference plane R1 is defined as the second projection 08111. The first projection 07211 overlaps the second projection 08111, and the sub-holder 072 is mounted at the bottom of the support arm 081. More specifically, the first projection 07211 always falls in a range of the second projection 08111. For example, the first connection hole 0811 is a waist-shaped hole, and the second connection hole 0721 is a circular hole. In this way, the connection member 084 can move in the first connection hole 0811, so that the sub-holder 072 can move or rotate relative to the support arm 081 for adjustment.

In other implementations, referring to FIG. 4 again, the apparatus 100 for identification and positioning further includes a first adjustment member 083. The support arm 081 defines a first adjustment hole 0812, the sub-holder 072 defines a second adjustment hole 0722, and the first adjustment member 083 is configured to pass through the first adjustment hole 0812 to connect the second adjustment hole 0722. As such, relative rotation between the support arm 081 and the sub-holder 072 is facilitated via the first adjustment hole 0812 and the second adjustment hole 0722. Specifically, in some implementations, the first adjustment hole 0812 is in a shape of arc, and the first adjustment hole 0812 extends in a shape of arc whose center is a center of the first connection hole 0811, which facilitates matching between the first adjustment hole 0812 and a rotation path of the sub-holder 072 relative to the support arm 081, and facilitates adjustment of the angle of the second detection member 07. Optionally, the first adjustment member 083 includes a bolt assembly, and thus the support arm 081 is detachably and fixedly connected to the sub-holder 072 via the bolt assembly.

In some implementations, multiple first adjustment holes 0812 are spaced apart from each other and arranged around the first rotation axis a. In this way, relative rotation between the support arm 081 and the sub-holder 072 can be more stable via the multiple first adjustment holes 0812 and the multiple second adjustment holes 0722. In implementations of the disclosure, the support arm 081 defines two first adjustment holes 0812 centered on the first rotation axis a and symmetrically arranged, and the sub-holder 072 defines two second adjustment holes 0722 in one-to-one correspondence with the two first adjustment holes 0812. In this way, it can be ensured that a rotation center line of the second detection member 07 coincides with the first rotation axis a when the angle of the second detection member 07 is adjusted, thereby preventing the second detection member 07 from colliding with an external component during rotating. The apparatus 100 for identification and positioning further includes four first adjustment members 083, i.e., two first adjustment members 083 are disposed on each support arm 081, and the two first adjustment members 083 are in one-to-one correspondence with the two first adjustment holes 0812.

Figure 8:
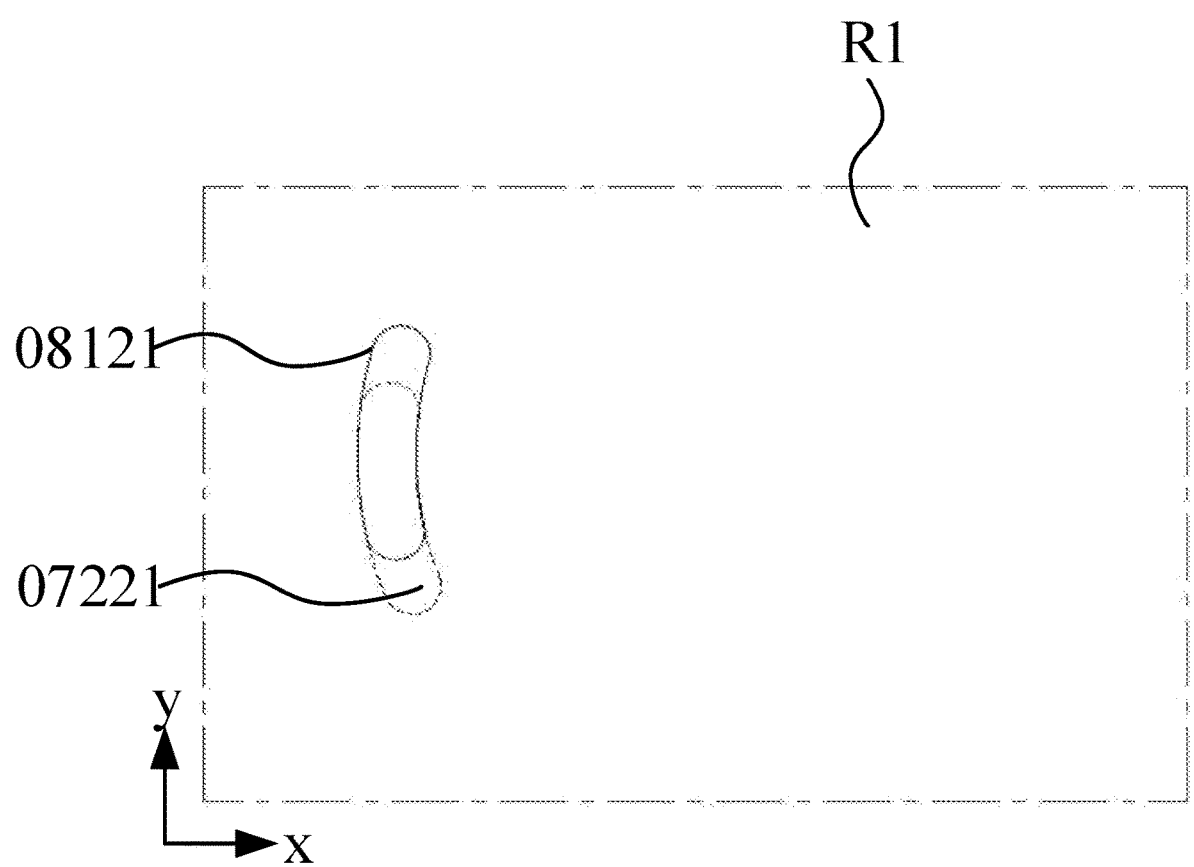
FIG. 8 is a schematic diagram of a third projection and a fourth projection provided in implementations of the disclosure.

Referring to FIG. 8, FIG. 8 illustrates a schematic diagram of a third projection 08121 and a fourth projection 07221 provided in implementations of the disclosure. In some implementations, the second detection member 07 has the first rotation axis a. A plane perpendicular to the first rotation axis a is defined as the first reference plane R1. An orthographic projection of the first adjustment hole 0812 on the first reference plane R1 is in a shape of arc. In this way, it is convenient for rotation of the second detection member 07 at the first rotation axis a. In some implementations, as illustrated in FIG. 8, during rotation of the second detection member 07, an orthographic projection of the first adjustment hole 0812 on the first reference surface R1 is the third projection 08121, an orthographic projection of the second adjustment hole 0722 on the first reference surface R1 is the fourth projection 07221, and the third projection 08121 at least partially overlaps the fourth projection 07221, which facilitates matching between the second adjustment hole 0722 and the rotation path of the first adjustment member 083 in the first adjustment hole 0812, thereby performing rotational adjustment on the second detection member 07.

In implementations of the disclosure, each of the orthographic projection of the first adjustment hole 0812 and the orthographic projection of the second adjustment hole 0722 on the first reference plane R1 is in a shape of arc, and a structure of each of the first adjustment hole 0812 and the second adjustment hole 0722 is similar to a waist-shaped hole with a radian, where waist-shaped hole with the radian is semicircular at two ends thereof and has a radian at the middle thereof. In other implementations, the second adjustment hole 0722 may be in other shapes, such as a circular shape, and the orthogonal projection of the second adjustment hole 0722 on the first reference plane R1 always falls in the range of the orthogonal projection of the first adjustment hole 0812 on the first reference plane R1.

Referring to FIG. 4 again, in some implementations, the apparatus 100 for identification and positioning further includes a first support frame 09. The first support frame 09 covers the support arm 081 and the second detection member 07, and is configured to be rotatably adjustable relative to the support arm 081. Specifically, there are multiple first support frames 09, the multiple first support frames 09 are in one-to-one correspondence with the multiple support arms 081, and the multiple first support frames 09 are in one-to-one correspondence with the multiple second detection members 07. In this way, the first support frame 09 can protect the second detection member 07. Specifically, in some implementations, the first support frame 09 and the second detection member 07 rotate synchronously. In this way, the first support frame 09 can rotate along with the rotation of the second detection member 07, thereby avoiding collision between the second detection member 07 and the first support frame 09 when the second detection member 07 rotates. In other implementations, the first support frame 09 may not rotate synchronously with the second detection member 07, which is not limited herein.

In some implementations, the first support frame 09 defines a fourth adjustment hole 091, and the apparatus 100 for identification and positioning further includes a second adjustment member 092. The second adjustment member 092 passes through the fourth adjustment hole 091 to connect the first holder 08, which facilitates rotation of the first support frame 09 relative to the first holder 08. Specifically, the first support frame 09 further defines a fourth connection hole 093. The fourth adjustment hole 091 is in a shape of arc, and the fourth adjustment hole 091 extends in a shape of arc whose center is a center of the fourth connection hole 093, which facilitates matching between the fourth adjustment hole 091 and a rotation path of the first support frame 09 relative to the support arm 081 and the second detection member 07, and facilitates adjustment of an angle of the first support frame 09.

More specifically, there are multiple fourth adjustment holes 091 spaced apart from each other and arranged around the first rotation axis a. In this way, rotation of the first support frame 09 can be more stable via the multiple fourth adjustment holes 091. In the implementation of the disclosure, the first support frame 09 defines two fourth adjustment holes 091 centered on the first rotation axis a and symmetrically arranged. In this way, it can be ensured that a rotation center line of the first support frame 09 coincide with the first rotation axis a when the angle of the second detection member 07 is adjusted, thereby preventing the first support frame 09 from colliding with the second detection member 07 during rotation. Optionally, the fourth adjustment hole 091 includes a waist-shaped hole with a radian. The apparatus 100 for identification and positioning further includes four second adjustment members 092, that is, two second adjustment members 092 are disposed on each support arm 081, and the two second adjustment members 092 are in one-to-one correspondence with the two fourth adjustment holes 091.

Figure 9:
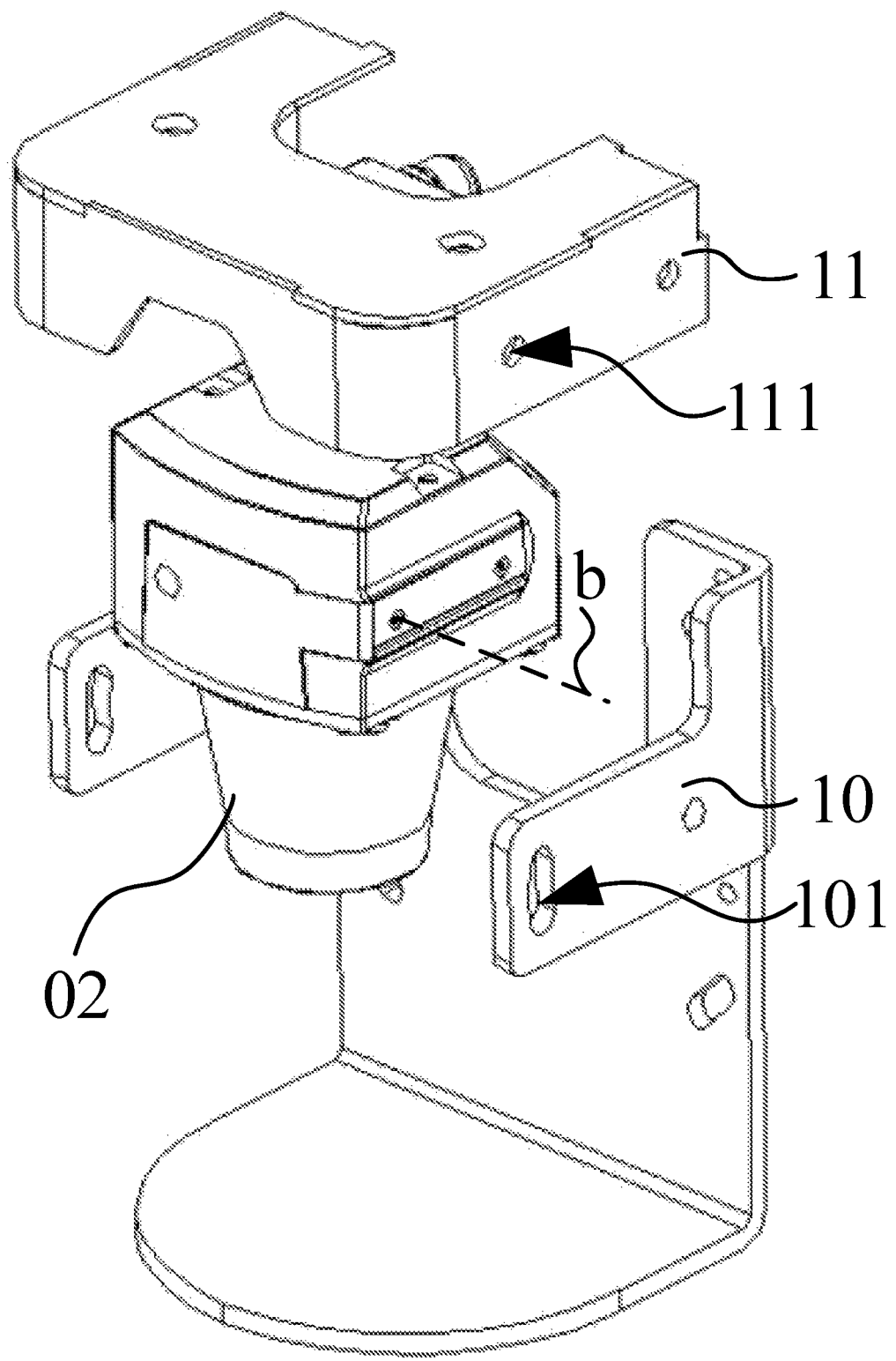
FIG. 9 is an exploded schematic structural view of a second holder provided in implementations of the disclosure.

Referring to FIG. 3 again, in conjunction with FIG. 9, FIG. 9 illustrates an exploded schematic structural view of a second holder 10 provided in implementations of the disclosure. In some implementations, the first detection member 02 is configured to be rotatably adjustable relative to the mounting member 01. In this way, detection of the cargo at different angles can be adapted by adjusting a rotational angle of the first detection member 02, thereby improving identification accuracy of the first detection member 02 for the cargo. In particular, the first detection member 02 has a second rotation axis b, where the second rotation axis b is perpendicular to the first rotation axis a.

Referring to FIG. 9, in some implementations, the apparatus 100 for identification and positioning further includes a second holder 10 and a second support frame 11. The first detection member 02 is connected to the second support frame 11. The second support frame 11 is connected to the mounting member 01 via the second holder 10. The second support frame 11 and the first detection member 02 each can rotate around the second rotation axis b relative to the second holder 10. In this way, the first detection member 02 can be more stably fixed via the second holder 10, and the first detection member 02 can be protected by the second support frame 11.

Specifically, in some implementations, the second holder 10 defines a third adjustment hole 101, and the second support frame 11 defines a third connection hole 111. The apparatus 100 for identification and positioning further includes a third adjustment member. The third adjustment member passes through the third adjustment hole 101 and the third connection hole 111 to connect the first detection member 02. In this way, relative rotation between the first detection member 02 and the second holder 10 can be facilitated via the third adjustment hole 101. More specifically, there are multiple third adjustment holes 101 arranged at intervals along the second rotation axis b and disposed on the second holder 10. There are multiple third connection holes 111 in one-to-one correspondence with the multiple third adjustment holes 101, so that the first detection member 02 can rotate more stably. Optionally, the third adjustment member includes a bolt assembly. In implementations of the disclosure, the second holder 10 defines two third adjustment holes 101, the second support frame 11 defines two third connection holes 111, and the apparatus 100 for identification and positioning further includes two third adjustment members. The two third adjustment members are in one-to-one correspondence with the two third adjustment holes 101, and the two third adjustment members are in one-to-one correspondence with the two third connection holes 111.

Figure 10:
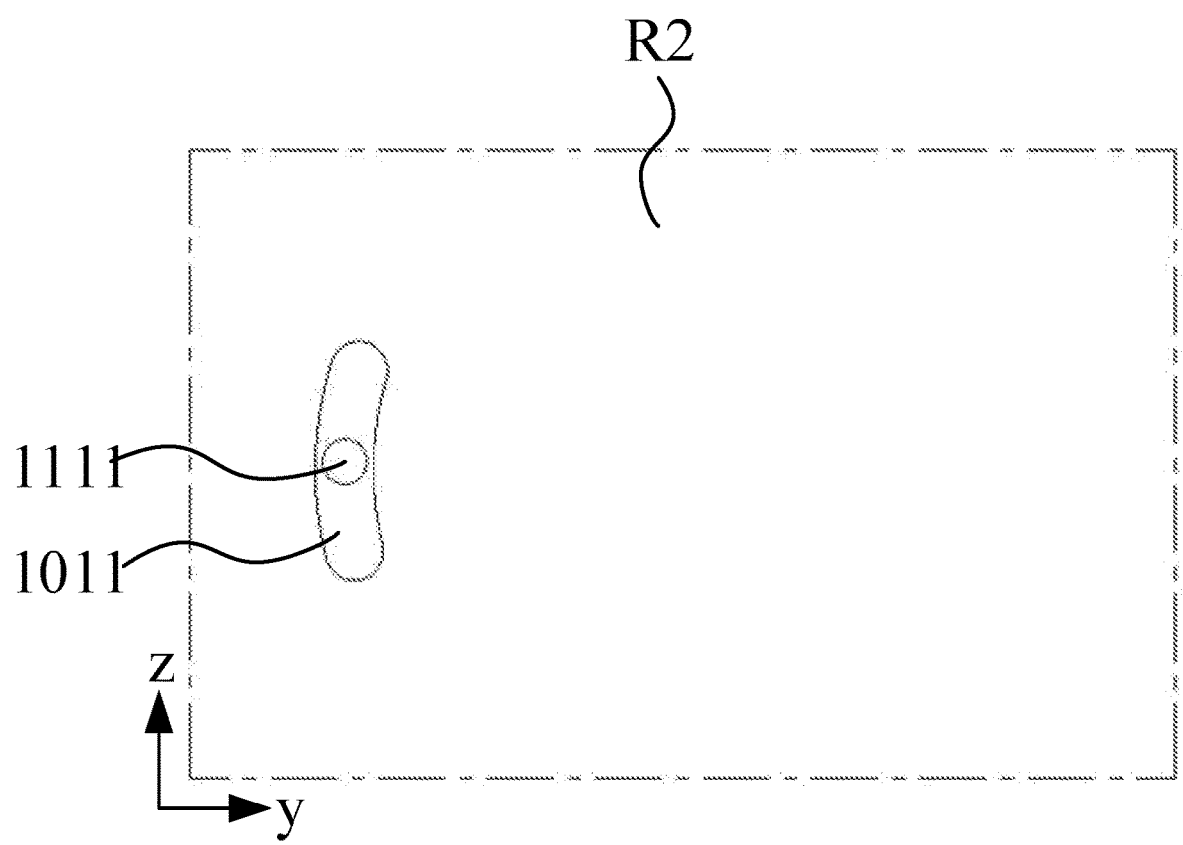
FIG. 10 is a schematic diagram of a fifth projection and a sixth projection provided in implementations of the disclosure.

FIG. 10 illustrates a schematic diagram of a fifth projection 1011 and a sixth projection 1111 in implementations of the disclosure. A plane perpendicular to the second rotation axis b is defined as a second reference plane R2. An orthographic projection of the third adjustment hole 101 on the second reference plane R2 is defined as the fifth projection 1011, an orthographic projection of the third connection hole 111 on the second reference plane R2 is defined as the sixth projection 1111, and the fifth projection 1011 overlaps the sixth projection 1111. More specifically, the sixth projection 1111 always falls in a range of the fifth projection 1011. For example, as illustrated in FIG. 10, the fifth projection 1011 is in a shape of arc, the sixth projection 1111 is in a shape of circle, and the third adjustment hole 101 extends in a shape of arc whose center is a center of the third connection hole 111, which facilitates matching between the third adjustment hole 101 and a rotation path of the second support frame 11 relative to the second holder 10, and facilitates adjustment of the angle of the first detection member 02.

In some implementations, the apparatus 100 for identification and positioning includes a driving member in driving connection with the second detection member 07. The driving member is configured to drive the second detection member 07 to rotate to adjust the angle of the second detection member 07. In this way, the second detection member 07 can be adjusted to a required angle more accurately by the driving member, thereby ensuring accurate identification of the cargo. In implementations of the disclosure, the driving member is a driving motor.

In some implementations, the driving member is in driving connection with the first detection member 02, and the driving member is configured to drive the first detection member 02 to rotate to adjust the angle. In this way, the first detection member 02 can be adjusted to a required angle more accurately by the driving member, thereby ensuring accurate identification of the cargo. In implementations of the disclosure, the driving member is a driving motor.

In some implementations, the first detection member 02 includes a laser scanner. The laser scanner is configured to identify point cloud information of the cargo and/or the cargo transportation device 200. Optionally, the laser scanner may be a 2D laser scanner or a 3D laser scanner. The second detection member 07 includes a camera. The camera is configured to identify image information of the cargo and/or the cargo transportation device 200. Optionally, the camera may be a 2D camera or a 3D camera. In implementations of the disclosure, the camera may also be an infrared camera, which facilitates acquisition of information of the cargo and/or the cargo transportation device 200 through cooperative use of the laser scanner and the camera, thereby positioning the cargo and/or the cargo transportation device 200 according to the information.

Referring to FIG. 3 again, in some implementations, the apparatus 100 for identification and positioning further includes a light supplementing member 12. The light supplementing member 12 is disposed on the support arm 081 and close to the second detection member 07, so that the light supplementing member 12 can supplement light to the second detection member 07, thereby further improving the accuracy of identification and positioning of the second detection member 07.

Specifically, in some implementations, the apparatus 100 for identification and positioning includes multiple light supplementing members 12. The multiple light supplementing members 12 are in one-to-one correspondence with the multiple support arms 081, and the multiple light supplementing members 12 are in one-to-one correspondence with the multiple second detection members 07. In this way, it can be ensured that each second detection member 07 can be supplemented with light, thereby improving the accuracy of identification and positioning of the apparatus 100 for identification and positioning. In implementations of the disclosure, the apparatus 100 for identification and positioning includes two light supplementing members 12. In implementations of the disclosure, each light supplementing member 12 is mounted at one side of the support arm 081 away from the second detection member 07.

Figure 13:
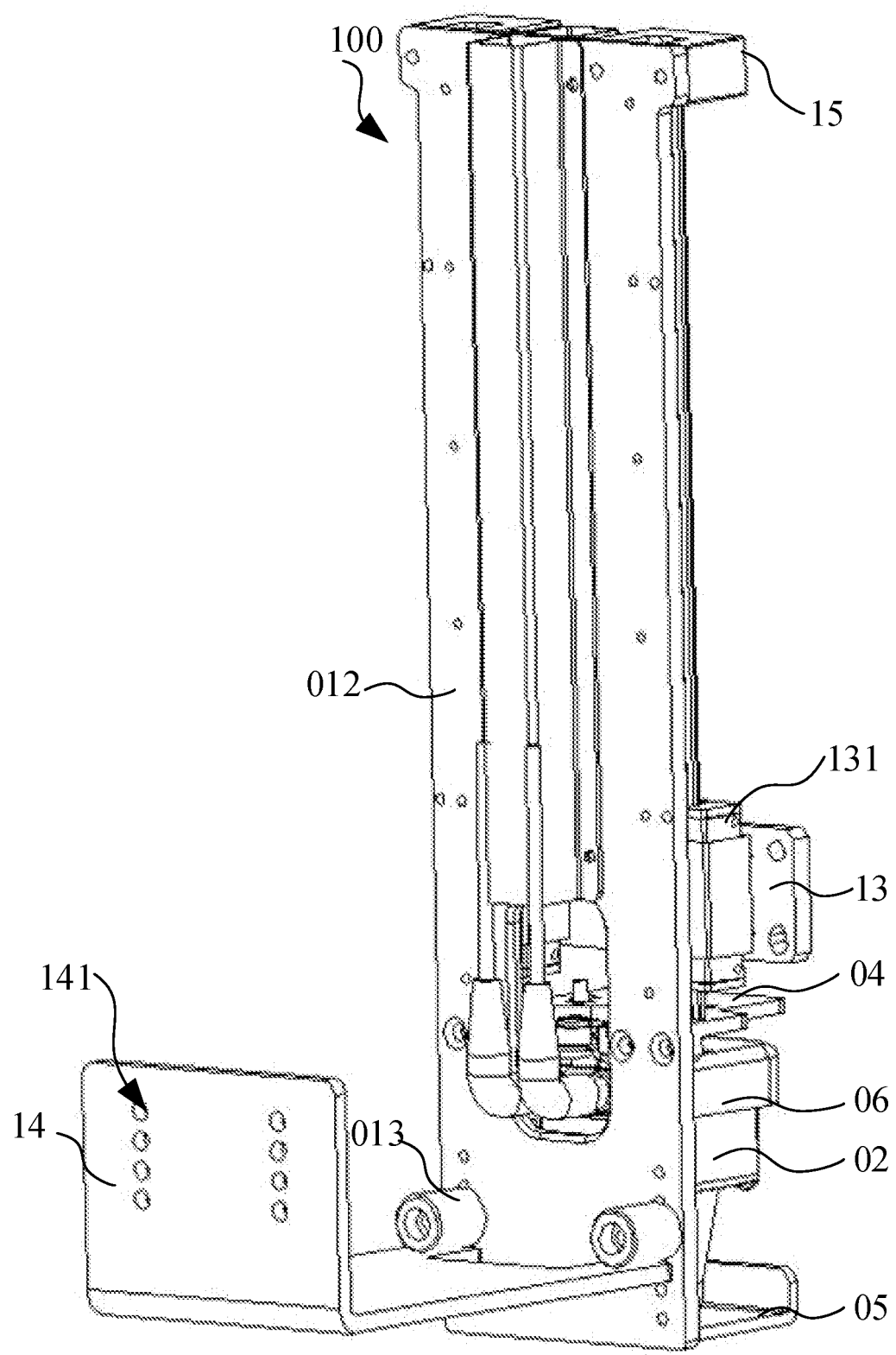
FIG. 13 is a schematic structural view of an apparatus for identification and positioning provided in implementations of the disclosure, from another view.
Figure 14:
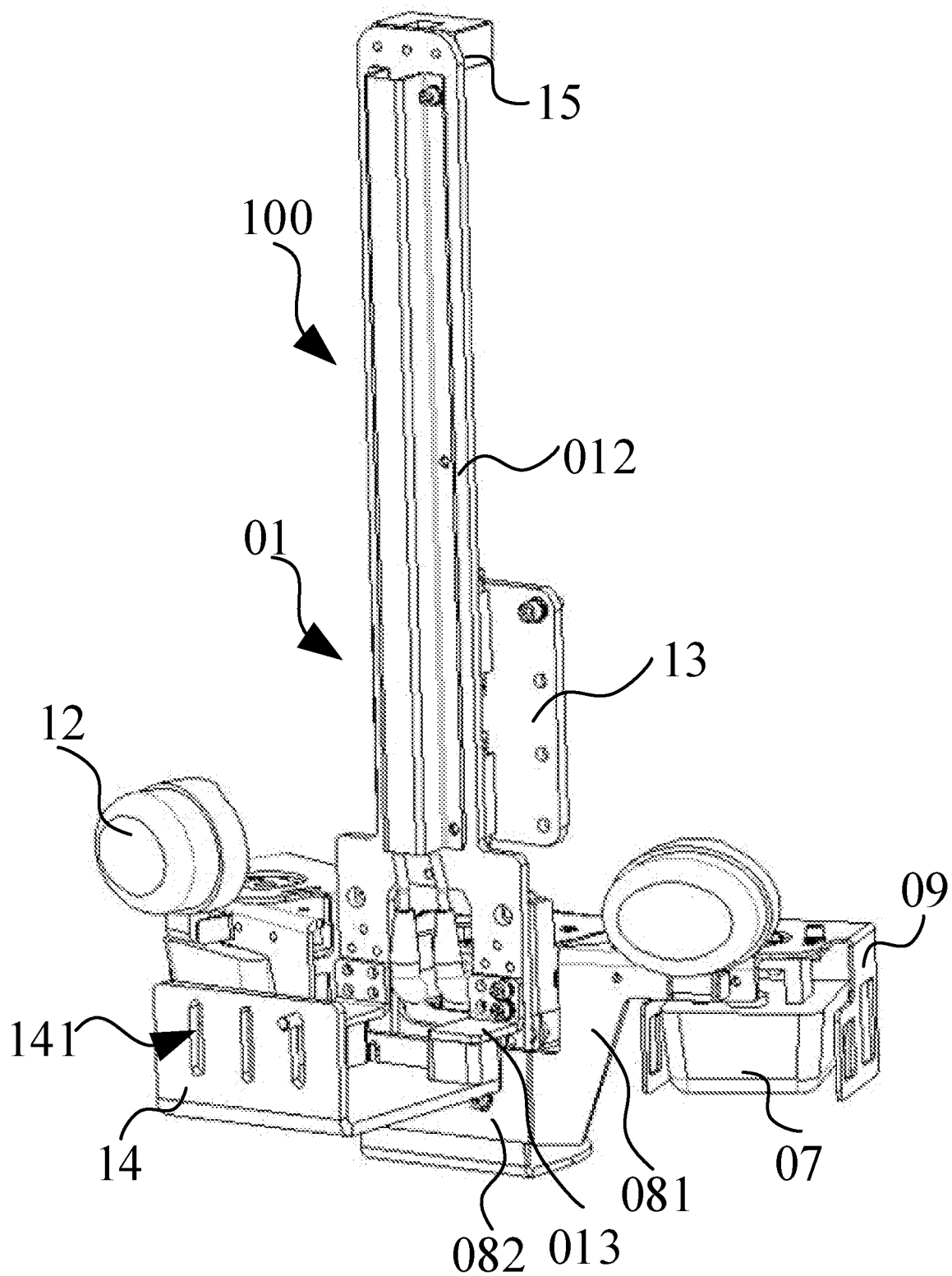
FIG. 14 is a schematic structural view of an apparatus for identification and positioning provided in other implementations of the disclosure, from another view.

Referring to FIG. 11 to FIG. 14, FIG. 11 illustrates a schematic structural view of a cargo transportation apparatus 1000 provided in implementations of the disclosure, FIG. 12 illustrates a schematic view of an assembled apparatus 100 for identification and positioning provided in implementations of the disclosure, FIG. 13 illustrates a schematic structural view of an apparatus 100 for identification and positioning provided in implementations of the disclosure, from another view, FIG. 14 is a schematic structural view of an apparatus 100 for identification and positioning provided in other implementations of the disclosure, from another view. Based on the same inventive concept, a cargo transportation device 1000 is further provided in the disclosure. The cargo transportation device 1000 includes the above cargo transportation device 200 and the above apparatus 100 for identification and positioning. The cargo transportation device 200 includes a handling member 210 and a vehicle body 220. The handling member 210 is slidably connected to the vehicle body 220, and the handling member 210 is moveable in a vertical direction relative to the vehicle body 220. The mounting member 01 is connected to the handling member 210, and the mounting member 01 is moveable in the vertical direction relative to the handling member 210. In this way, the cargo transportation apparatus 1000 can accurately position and identify the cargo with the apparatus 100 for identification and positioning, thereby facilitating transportation of the cargo by the cargo transportation apparatus 1000. For a connection relationship between the cargo transportation device 200 and the apparatus 100 for identification and positioning, reference can be made to the content in the foregoing implementations, which will not be repeated herein.

In some implementations, the mounting member 01 has a first state and a second state. When a rising height of the handling member 210 in the vertical direction relative to the vehicle body 220 does not exceed a preset limit value, the mounting member 01 is in the first state, the vehicle body 220 is configured to abut against the mounting member 01, and the mounting member 01 and the first detection member 02 and/or the second detection member 07 disposed on the mounting member 01 are limited by the vehicle body 220 and remain relatively stationary. When the rising height of the handling member 210 in the vertical direction relative to the vehicle body 220 exceeds the preset limit value, the mounting member 01 is in the second state, and the mounting member 01 and the first detection member 02 and/or the second detection member 07 disposed on the mounting member 01 are configured to continue synchronous rising along with the handling member 210 in the vertical direction relative to the vehicle body 220. In one implementation, the preset limit value is 250 mm. In this way, when the mounting member 01 is in the first state, the mounting member 01 and the first detection member 02 and/or the second detection member 07 disposed on the mounting member 01 each remain stationary relative to the vehicle body 220. As such, the first detection member 02 and/or the second detection member 07 are prevented from shaking, where the shaking is caused due to movement of the first detection member 02 and/or the second detection member 07 relative to the vehicle body 220, thereby improving identification accuracy of the first detection member 02 and/or the second detection member 07 for the cargo. When the mounting member 01 is in the second state, the mounting member 01 and the first detection member 02 and/or the second detection member 07 disposed on the mounting member 01 can continue synchronous rising along with the handling member 210, thereby adapting to accurate acquisition of information of the cargo in different scenarios.

In conjunction with FIG. 1 to FIG. 3, FIG. 5, and FIG. 12 to FIG. 14, in some implementations, the apparatus for identification and positioning 100 further includes a connection plate 13. The handling member 210 is slidably connected to the mounting member 01 through the connection plate 13. Specifically, the mounting member 01 is moveable in the vertical direction relative to the handling member 210 via the connection plate 13. The apparatus 100 for identification and positioning further includes a fixing member 14. The fixing member 14 is configured to be connected to the vehicle body 220. The fixing member 14 is further configured to abut against the mounting member 01 when the mounting member 01 is in the first state, to enable that the mounting member 01 and the first detection member 02 and/or the second detection member 07 disposed on the mounting member 01 are limited by the vehicle body 220 and remain relatively stationary. In this way, under a self-weight of the mounting member 01, the mounting member 01 can remain stable by abutting against the fixing member 14. Specifically, the mounting member 01 includes a mounting-member body 012 and an abutment portion 013. The first detection member 02 is disposed at one side of the mounting-member body 012, and the abutment portion 013 is disposed at one side of the mounting-member body 012 away from the first detection member 02 and is configured to abut against the fixing member 14. In this way, the abutment portion 013 can more stably abut against the fixing member 14, thereby ensuring stability of the mounting member 01.

The fixing member 14 defines a fixing hole 141 configured to fixedly connect the fixing member 14 with the vehicle body 220.

FIG. 13 illustrates a schematic structural view of an apparatus 100 for identification and positioning provided in implementations of the disclosure, from another view. As illustrated in FIG. 13, in some implementations, there are multiple fixing holes 141 arranged at intervals in the vertical direction. In this way, a connection position between the fixing member 14 and the vehicle body 220 in the vertical direction can be adjusted through the multiple fixing holes 141, thereby adjusting the preset limit value of the rising height of the handling member 210 in the vertical direction relative to the vehicle body 220. Furthermore, the multiple fixing holes 141 are arranged in an array, so that the fixing member 14 can be connected to the vehicle body 220 more reliably through the multiple fixing holes 141. In the implementation corresponding to FIG. 13, there are eight fixing holes 141 arranged in two columns and four rows, spaced apart from each other, and disposed on the fixing member 14. It needs to be noted that the fixing member 14 is a limit base plate.

FIG. 14 illustrates a schematic structural view of an apparatus 100 for identification and positioning provided in other implementations of the disclosure, from another view. Referring to FIG. 14, in other implementations, the fixing hole 141 is a waist-shaped hole, and the waist-shaped hole extends in the vertical direction. In this way, the connection position between the fixing member 14 and the vehicle body 220 in the vertical direction can be adjusted through the waist-shaped hole, thereby adjusting the preset limit value of the rising height of the handling member 210 in the vertical direction relative to the vehicle body 220. Specifically, there are multiple fixing holes 141 spaced apart from each other in a first direction (namely, x-axis direction illustrated in FIG. 3) and disposed on the fixing member 14, so that the fixing member 14 can be connected to the vehicle body 220 more stably through the multiple fixing holes 141. In implementations of the disclosure, there are three fixing holes 141, and the three fixing holes 141 are spaced apart from each other and disposed on the fixing member 14. It needs to be noted that the fixing member 14 is a limit base plate.

Referring to FIGS. 1, 3, and 11 again, in some implementations, the apparatus 100 for identification and positioning further includes an anti-falling block 15 disposed on the mounting member 01. The anti-falling block 15 is configured to realize linkage between the mounting member 01 and the handling member 210 when the mounting member 01 is in the second state, to enable that the mounting member 01 and the first detection member 02 and/or the second detection member 07 disposed on the mounting member 01 continue synchronous rising along with the handling member 210 in the vertical direction relative to the vehicle body 220. Specifically, in some implementations, the fixing member 14 is disposed at an end of the mounting member 01, specifically a bottom of the mounting member 01, and the anti-falling block 15 is disposed at an end of the mounting member 01 away from the fixing member 14, that is, at a top of the mounting member 01.

Referring to FIGS. 1, 3, and 5 again, in some implementations, one of the connection plate 13 and the mounting member 01 is provided with a sliding rail 011, the other of the connection plate 13 and the mounting member 01 is provided with a sliding block 131, and the sliding block 131 is slidably connected to the sliding rail 011. In some implementations, the sliding block 131 is disposed on the connection plate 13, and the sliding rail 011 is disposed on the mounting member 01. The anti-falling block 15 is disposed at an end of the sliding rail 011. Specifically, the anti-falling block 15 is disposed at a top of the sliding rail 011, and the sliding block 131 can abut against the anti-falling block 15, thereby realizing the linkage between the mounting member 01 and the handling member 210. In addition, the anti-falling block 15 can also prevent the sliding block 131 from detaching from the sliding rail 011.

Specifically, in implementations illustrated in FIG. 1 or FIG. 5, there are multiple sliding rails 011 spaced apart from each other in the first direction, and there are multiple sliding blocks 131 spaced apart from each other in the first direction. The multiple sliding rails 011 are in one-to-one correspondence with and slidably connected to the multiple sliding blocks 131. As such, when the sliding blocks 131 abut against the anti-falling block 15 and apply a force to enable the mounting member 01 to rise, the multiple sliding blocks 131 apply a more uniform force to the anti-falling block 15. Furthermore, stability of sliding of the connection plate 13 relative to the mounting member 01 can be improved through the multiple sliding rails 011 and the multiple sliding blocks 131. In some implementations, as illustrated in FIGS. 1 and 14, there are two sliding rails 011 spaced apart from each other in the vertical direction and two sliding blocks 131 spaced apart from each other in the vertical direction, and the two sliding blocks 131 are in one-to-one correspondence with and slidably connected to the two sliding rails 011. In the implementation corresponding to FIG. 1, two anti-falling blocks 15 are disposed on the mounting member 01, and the two anti-falling blocks 15 are in one-to-one correspondence with the two sliding rails 011. In the implementation corresponding to FIG. 5, four anti-falling blocks 15 are disposed on the mounting member 01, and every two anti-falling blocks 15 are disposed at two ends of one sliding rail 011, respectively.

Referring to FIG. 5 again, in some implementations, the apparatus 100 for identification and positioning further includes a drag chain 16 connected to the mounting member 01. More specifically, the drag chain 16 is connected to the top of the mounting member 01. In this way, the drag chain 16 can draw and protect a built-in cable, an oil pipe, a gas pipe, a water pipe, and the like.

According to the apparatus 100 for identification and positioning and the cargo transportation apparatus 1000 provided in implementations of the disclosure, the apparatus 100 for identification and positioning includes the mounting member 01 and the first detection member 02. The mounting member 01 is configured to be connected to the handling member 210 of the cargo transportation device 200. The first detection member 02 is configured to identify and position the cargo or the cargo transportation device 200. As such, the cargo or the cargo transportation device 200 can be automatically positioned with the first detection member 02, thereby reducing manual operations and improving efficiency of cargo pickup and unloading of the cargo transportation apparatus 1000.

Furthermore, in some implementations, when the handling member 210 drives the first detection member 02 to move in the vertical direction relative to the vehicle body 220 and thus the first detection member 02 is damaged due to the impact force, since the floating mechanism 03 is arranged between the mounting member 01 and the first detection member 02, the floating mechanism 03 enables the first detection member 02 to float in the vertical direction relative to the mounting member 01. As such, the external impact force acting directly on the first detection member 02 can be weakened by buffering via the floating mechanism 03, thereby preventing the first detection member 02 from being damaged, and improving identification accuracy of the first detection member 02 for the cargo.

Furthermore, in the apparatus 100 for identification and positioning and the cargo transportation device 1000 provided in implementations of the disclosure, acquisition of information of the cargo and/or the cargo transportation device 200 is facilitated through integrated mounting and cooperative use of the first detection member 02 and the second detection member 07. The second detection member 07 can be rotated and adjusted through the first adjustment hole 0812 defined on the first holder 08, and the first detection member 02 can be rotated and adjusted through the third adjustment hole 101 defined on the second holder 10. Meanwhile, the apparatus 100 for identification and positioning further can supplement light to the second detection member 07 through the light supplementing member 12, thereby improving the accuracy of identification and positioning of the apparatus 100 for identification and positioning for the cargo.

The technical features in the above implementations can be combined in any manner. In an effort to provide a concise description, not all of the possible combinations of the technical features in the above implementations are described. However, any combination of these technical features should be considered within the scope as recited in this specification unless there is a contradiction in such a combination.

The above implementations only show several implementations of the present disclosure, and the descriptions thereof are relatively specific and detailed, but cannot be understood as a limitation to the scope of the present disclosure. It should be noted that for those of ordinary skill in the art, without departing from the concept of the present disclosure, several modifications and improvements can be made, and these all belong to the protection scope of the present disclosure. Therefore, the protection scope of the disclosure shall be referred to the appended claims.

What is claimed is:

1. An apparatus for identification and positioning, comprising:
   a mounting member configured to be connected to a handling member of a cargo transportation device; and
   a first detection member disposed on the mounting member and configured to identify and position a cargo or the cargo transportation device.

2. The apparatus for identification and positioning of claim 1, further comprising a floating mechanism connected between the first detection member and the mounting member, wherein the floating mechanism enables the first detection member to float in a vertical direction relative to the mounting member.

3. The apparatus for identification and positioning of claim 2, wherein the floating mechanism comprises an elastic member elastically abutting between the mounting member and the first detection member.

4. The apparatus for identification and positioning of claim 3, wherein the floating mechanism further comprises a guiding member, one end of the guiding member is connected to one of the mounting member and the first detection member, and the other end of the guiding member is slidably connected to the other of the mounting member and the first detection member, the guiding member is configured to guide the first detection member to move in the vertical direction relative to the mounting member, and the elastic member is sleeved on the guiding member.

5. The apparatus for identification and positioning of claim 3, wherein the floating mechanism is implemented as at least two floating mechanisms, and the at least two floating mechanisms are spaced apart from each other and arranged between the mounting member and the first detection member.

6. The apparatus for identification and positioning of claim 5, wherein an elastic deformation amount of the elastic member of each of the at least two floating mechanisms is adjustable to adjust levelness of the first detection member.

7. The apparatus for identification and positioning of claim 2, further comprising:
   a positioning member projecting from the mounting member, wherein the floating mechanism is connected between the positioning member and the first detection member.

8. The apparatus for identification and positioning of claim 1, further comprising:
   a first protective member connected to the mounting member and disposed at a bottom of the first detection member; and/or
   a second protective member covering the first detection member.

9. The apparatus for identification and positioning of claim 1, further comprising a second detection member, wherein the second detection member and the first detection member spaced apart from each other are disposed on the mounting member, the first detection member is configured to identify point cloud information of the cargo and/or the cargo transportation device, and the second detection member is configured to identify image information of the cargo and/or the cargo transportation device.

10. The apparatus for identification and positioning of claim 9, wherein the apparatus for identification and positioning is configured to extract a region of interest (ROI) according to the point cloud information and/or the image information, detect a target object in the ROI, and determine, according to a state of the ROI, whether to stack the cargo or whether the cargo slides, wherein the target object comprises a cargo to-be-stacked and a cargo stacked; and
   when the apparatus for identification and positioning is configured to determine whether to stack the cargo, the state of the ROI comprises: the cargo stacked or the cargo to-be-stacked being detected in the ROI, whether a pose deviation between the cargo stacked and the cargo to-be-stacked in the ROI exceeds a preset range, or no cargo stacked or no cargo to-be-stacked being detected in the ROI; or
   when the apparatus for identification and positioning is configured to determine whether the cargo slides, the state of the ROI comprises: the cargo stacked or the cargo to-be-stacked being detected in the ROI, whether a horizontal coordinate of the cargo stacked or the cargo to-be-stacked in the ROI exceeds the preset range, or no cargo stacked or no cargo to-be-stacked being detected in the ROI.

11. The apparatus for identification and positioning of claim 9, wherein the first detection member is configured to be rotatably adjustable relative to the mounting member.

12. The apparatus for identification and positioning of claim 9, wherein the second detection member is configured to be rotatably adjustable relative to the mounting member.

13. The apparatus for identification and positioning of claim 12, further comprising a first holder and a connection member, wherein
the first holder comprises a connection arm and a support arm connected to the connection arm, the connection arm is connected to the mounting member, and the second detection member comprises a second-detection-member body and a sub-holder connected to the second-detection-member body, wherein
the support arm defines a first connection hole, the sub-holder defines a second connection hole adapted to the first connection hole, the connection member is configured to pass through the first connection hole and the second connection hole, and the support arm is rotatably connected to the sub-holder via the connection member.

14. The apparatus for identification and positioning of claim 13, further comprising a first adjustment member, wherein the support arm defines a first adjustment hole, the sub-holder defines a second adjustment hole, and the first adjustment member is configured to pass through the first adjustment hole and the second adjustment hole.

15. The apparatus for identification and positioning of claim 14, wherein the second detection member has a first rotation axis, and an orthographic projection of the first adjustment hole on a plane perpendicular to the first rotation axis is in a shape of arc.

16. The apparatus for identification and positioning of claim 13, further comprising a light supplementing member, wherein
the light supplementing member is disposed on the support arm and close to the second detection member.

17. The apparatus for identification and positioning of claim 10, wherein the first detection member comprises a 2-dimensional (2D) laser radar or a 3-dimensional (3D) laser radar, and/or the second detection member comprises a 2D camera or a 3D camera.

18. The apparatus for identification and positioning of claim 1, wherein the cargo transportation device further comprises a vehicle body, the handling member is slidably connected to the vehicle body, the handling member is movable in a vertical direction relative to the vehicle body, the mounting member is slidably connected to the handling member, the mounting member is movable in the vertical direction relative to the handling member, and the mounting member has a first state and a second state; and
when a rising height of the handling member in the vertical direction relative to the vehicle body does not exceed a preset limit value, the mounting member is in the first state, the vehicle body is configured to abut against the mounting member, and the mounting member and the first detection member disposed on the mounting member are limited by the vehicle body and remain relatively stationary; or
when the rising height of the handling member in the vertical direction relative to the vehicle body exceeds the preset limit value, the mounting member is in the second state, and the mounting member and the first detection member disposed on the mounting member are configured to continue synchronous rising along with the handling member in the vertical direction relative to the vehicle body.

19. The apparatus for identification and positioning of claim 18, further comprising at least one of:
a connection plate through which the handling member is slidably connected to the mounting member;
a fixing member configured to be connected to the vehicle body, wherein the fixing member is further configured to abut against the mounting member when the mounting member is in the first state, to enable that the mounting member and the first detection member disposed on the mounting member are limited by the vehicle body and remain relatively stationary; or
an anti-falling block disposed on the mounting member, wherein the anti-falling block is configured to realize linkage between the mounting member and the handling member when the mounting member is in the second state, to enable that the mounting member and the first detection member disposed on the mounting member continue synchronous rising along with the handling member in the vertical direction relative to the vehicle body.

20. A cargo transportation apparatus, comprising a cargo transportation device and an apparatus for identification and positioning, wherein the cargo transportation device comprises a handling member and a vehicle body, the handling member is slidably connected to the vehicle body, the handling member is moveable in a vertical direction relative to the vehicle body, the apparatus for identification and positioning comprises a mounting member and a first detection member, the mounting member is connected to the handling member of the cargo transportation device, and the first detection member is disposed on the mounting member and configured to identify and position a cargo or the cargo transportation device.

\* \* \* \* \*